(12) United States Patent
Godinsky et al.

(10) Patent No.: US 12,379,241 B2
(45) Date of Patent: Aug. 5, 2025

(54) TRAY MOUNTING ASSEMBLY FOR A SCALE

(71) Applicant: Pelstar, LLC, McCook, IL (US)

(72) Inventors: Joseph M. Godinsky, McCook, IL (US); Kenneth J. Bargo, McCook, IL (US)

(73) Assignee: Pelstar, LLC, McCook, IL (US)

( * ) Notice: Subject to any disclaimer, the term of this patent is extended or adjusted under 35 U.S.C. 154(b) by 501 days.

(21) Appl. No.: 17/746,122

(22) Filed: May 17, 2022

(65) Prior Publication Data

US 2022/0364906 A1 Nov. 17, 2022

Related U.S. Application Data

(60) Provisional application No. 63/189,594, filed on May 17, 2021.

(51) Int. Cl.
*G01G 21/22* (2006.01)
*G01G 21/23* (2006.01)
*G01G 23/36* (2006.01)

(52) U.S. Cl.
CPC ............ *G01G 21/22* (2013.01); *G01G 21/23* (2013.01); *G01G 23/36* (2013.01)

(58) Field of Classification Search
CPC ......... G01G 21/22; G01G 21/23; G01G 23/26
USPC ....................................................... 177/253
See application file for complete search history.

(56) References Cited

U.S. PATENT DOCUMENTS

| | | |
|---|---|---|
| 1,883,548 A | 10/1932 | Carlson |
| 3,545,558 A | 12/1970 | Maugh |
| 3,565,196 A | 2/1971 | Eric et al. |
| 3,915,248 A | 10/1975 | Paelian |
| 4,363,371 A | 12/1982 | Hutchinson |
| 4,411,327 A | 10/1983 | Lockery et al. |
| 4,478,303 A | 10/1984 | Boyles |
| 4,506,746 A | 3/1985 | Lockery |
| 4,554,987 A | 11/1985 | Dillon |
| 4,585,082 A | 4/1986 | Harrington et al. |
| 4,666,006 A | 5/1987 | Wernimont |
| 4,712,627 A | 12/1987 | Harrington et al. |

(Continued)

FOREIGN PATENT DOCUMENTS

| | | |
|---|---|---|
| EP | 0116170 A2 | 8/1984 |
| GB | 793246 A | 9/1954 |

(Continued)

*Primary Examiner* — Jacques M Saint Surin
(74) *Attorney, Agent, or Firm* — Michael Best & Friedrich LLP

(57) ABSTRACT

A scale platform mounting assembly, a scale and a method of assembly. The scale may generally include a housing assembly supportable on a surface; a weight sensor supported in the housing assembly; a platform operable to support an object to be weighed, a force on the platform being applied to the weight sensor; and a mounting assembly to removably connect the platform relative to the housing assembly. The mounting assembly may include a stud supported by one of the housing assembly and the platform, the stud having a ball end, and a mount supported by the other of the housing assembly and the platform, the mount defining a recess having an open end, the ball end of the stud being receivable in the recess through the open end to removably connect the platform.

20 Claims, 32 Drawing Sheets

(56) References Cited

U.S. PATENT DOCUMENTS

| | | | |
|---|---|---|---|
| 4,880,069 A | 11/1989 | Bradley | |
| 5,029,483 A | 7/1991 | Gautschi et al. | |
| 5,510,581 A | 4/1996 | Angel | |
| 5,773,767 A * | 6/1998 | Collins, Jr. | G01G 19/56 177/127 |
| 5,955,705 A * | 9/1999 | Germanton | G01G 21/22 177/253 |
| 6,433,289 B1 | 8/2002 | Gurr | |
| 6,781,067 B2 * | 8/2004 | Montagnino | G01G 23/3728 177/173 |
| 6,912,920 B2 | 7/2005 | Fortune et al. | |
| 7,005,587 B2 | 2/2006 | Axakov et al. | |
| 7,202,424 B2 * | 4/2007 | Carlucci | G01G 19/44 177/199 |
| 7,244,896 B2 | 7/2007 | Honda et al. | |
| 7,294,793 B2 | 11/2007 | Axakov et al. | |
| 8,796,565 B2 | 8/2014 | Lauer | |
| 8,987,616 B2 * | 3/2015 | Ngoh | G01G 19/44 177/144 |
| 9,366,588 B2 * | 6/2016 | Lee | G01L 1/26 |
| 9,612,150 B2 | 4/2017 | Perrea et al. | |
| 9,719,843 B2 | 8/2017 | Thirouin et al. | |
| 2018/0080810 A1 | 3/2018 | Weiss et al. | |

FOREIGN PATENT DOCUMENTS

| | | |
|---|---|---|
| GB | 1083260 A | 9/1967 |
| WO | 2012143094 A1 | 10/2012 |

* cited by examiner

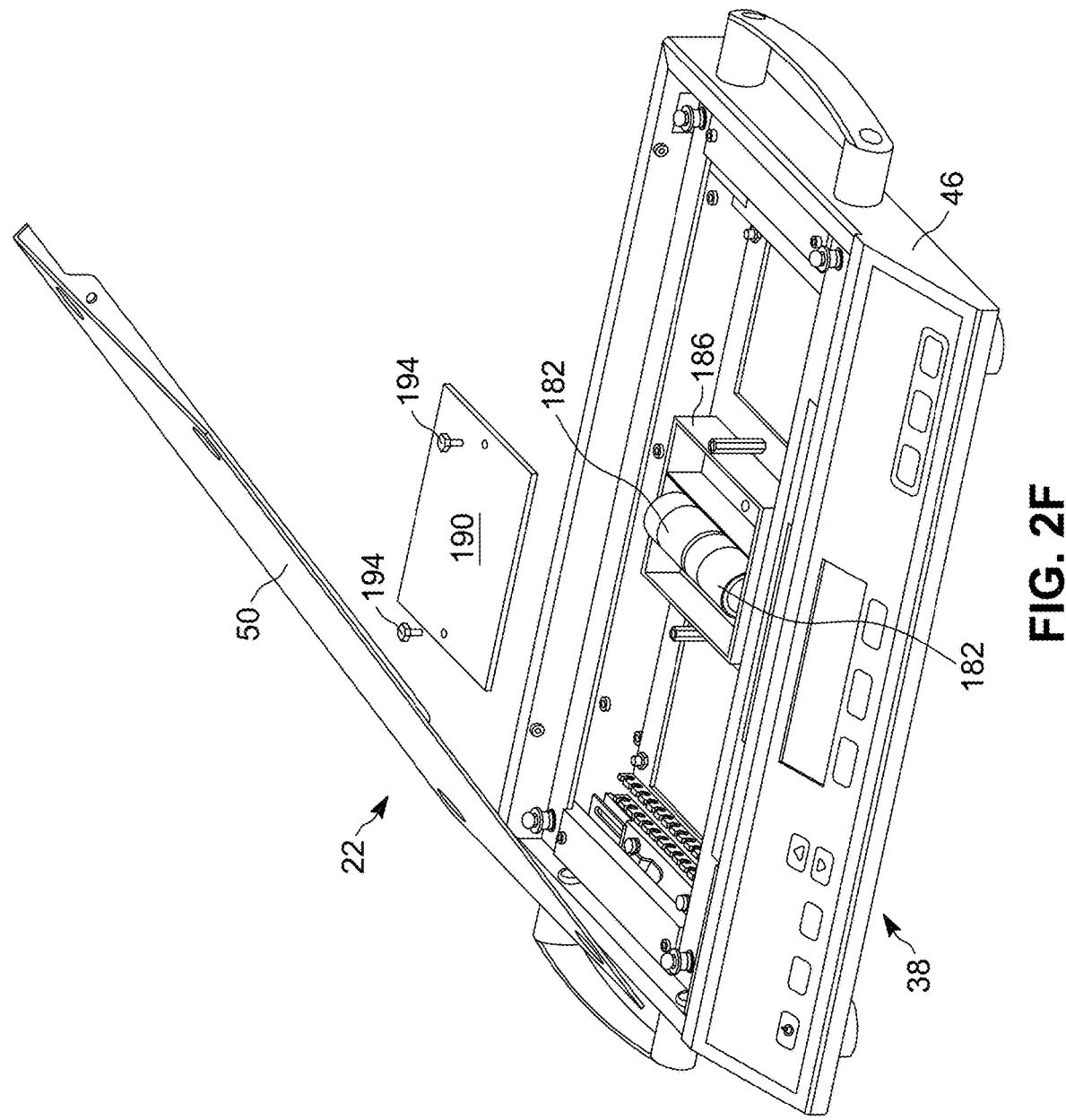

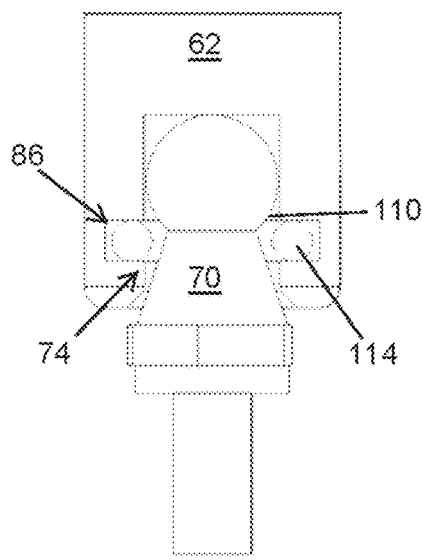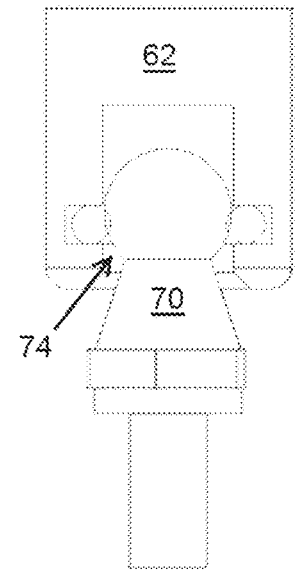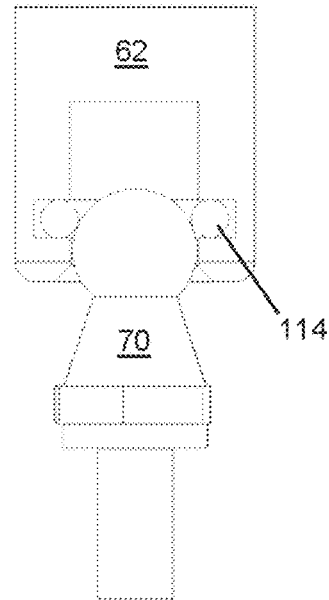
FIG. 4A    FIG. 4B    FIG. 4C
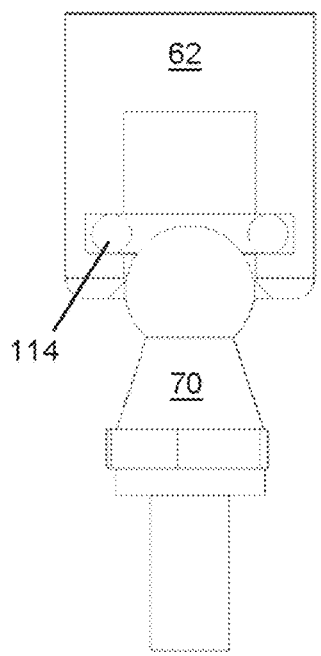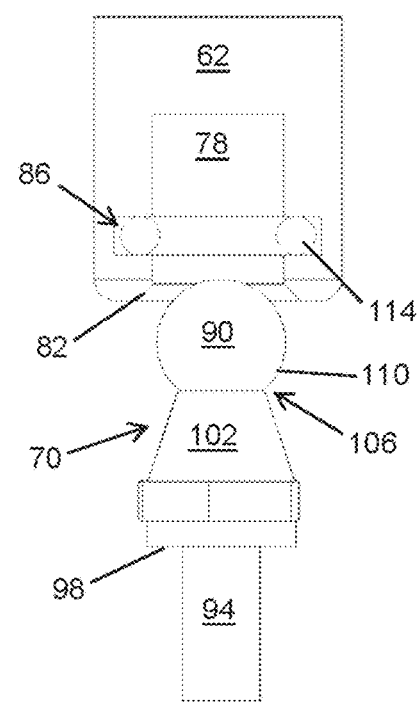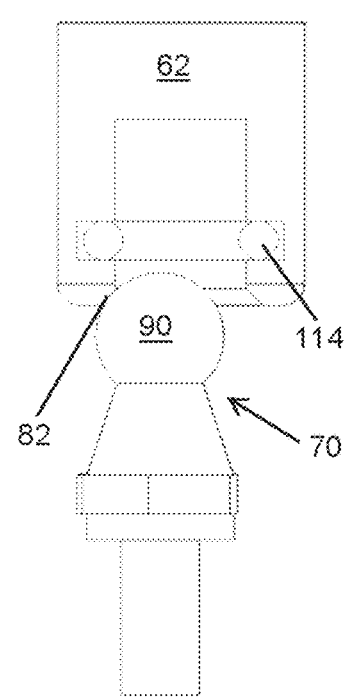
FIG. 4D    FIG. 4E    FIG. 4F

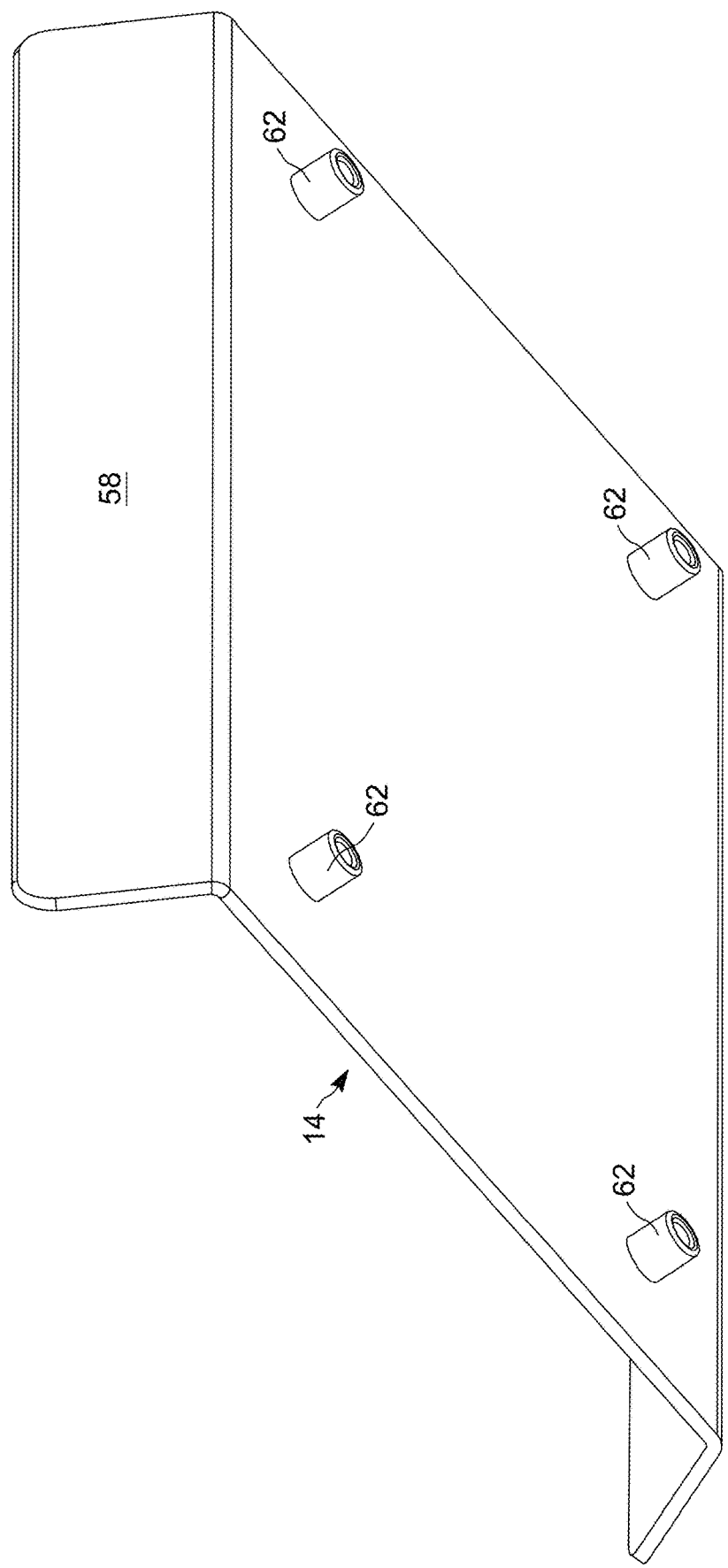

TRAY MOUNTING ASSEMBLY FOR A SCALE

RELATED APPLICATION

The present application claims the benefit of U.S. Patent Application No. 63/189,594, filed May 17, 2021, the entire contents of which is hereby incorporated by reference.

FIELD

The present invention relates to scales, such as medical scales, and, more particularly, to a mounting assembly for a scale tray, platform or support.

SUMMARY

A scale generally includes a platform to support an object to be weighed (e.g., a human), and a weight sensor to which a force on the platform is applied to determine the weight of the object being weighed. Some scales, such as neonatal scales, include a platform or tray which is removable from the scale body, for example, for cleaning and disinfection, battery replacement, etc.

Such existing scales include, proximate each corner of the tray, a pin and hole arrangement with a spring-loaded retainer to hold the tray in place on the scale body. Each pin and hole (see the pin shown in FIG. 12) has a linear interface with a close tolerance to ensure accurate weight measurement, and, as a result, the tray must be removed and installed in a perpendicular direction and with great care. Unfortunately, due to this weakness in the design, the pins are often damaged or broken, requiring frequent field replacement.

In some independent embodiments, the present invention may generally provide a scale with a tray mounting assembly incorporating a ball and socket design to position the tray on the scale body and a captured O-ring in the tray mounting post to keep the tray in place. In some aspects, this design may allow for easier positioning of the tray when installing (e.g., due to the lead-in on the post and/or mount) as well as flexibility to remove the tray at any angle without damage to the mounting members.

In one independent aspect, a scale may generally include a housing assembly supportable on a surface; a weight sensor supported in the housing assembly; a platform operable to support an object to be weighed, a force on the platform being applied to the weight sensor; and a mounting assembly to removably connect the platform relative to the housing assembly. The mounting assembly may include a stud supported by one of the housing assembly and the platform, the stud having a ball end, and a recess defined by the other of the housing assembly and the platform, the recess having an open end, the ball end of the stud being receivable in the recess through the open end to removably connect the platform.

In another independent aspect, the mounting assembly may generally include a stud supported by one of the housing assembly and the platform, the stud having a ball end, and a mount supported by the other of the housing assembly and the platform, the mount defining a recess having an open end, the ball end of the stud being receivable in the recess through the open end to removably connect the platform.

In yet another independent aspect, the mounting assembly may generally include a plurality of studs supported by one of the housing assembly and the platform, each stud having a ball end, and a corresponding plurality of mounts supported by the other of the housing assembly and the platform, each mount defining a recess having an open end, the ball end of an associated stud being receivable in the recess through the open end to removably connect the platform.

In a further independent aspect, a scale may generally include a housing assembly supportable on a surface; a platform operable to support an object to be weighed; a weight sensor supported in the housing assembly, a force on the platform being applied to the weight sensor, the weight sensor including a first load cell and a second load cell spaced from the first load cell; and a frame assembly between the platform and the weight sensor, the frame assembly including a first mounting bar engaging the first load cell, a second mounting bar engaging the second load cell, and a crossbar connecting the first mounting bar and the second mounting bar.

In another aspect, the weight sensor may include a first pair of load cells and a second pair of load cells spaced from the first pair, the first mounting bar engaging the first pair of load cells, the second mounting bar engaging the second pair of load cells, first and second crossbars connecting opposite ends of the first mounting bar and the second mounting bar.

In yet another independent aspect, a method of assembling a scale may be provided. The method may generally include providing a scale body including a housing assembly supportable on a surface, and a weight sensor supported in the housing assembly; providing a platform operable to support an object to be weighed, a force on platform being applied to the weight sensor; and engaging a mounting assembly to removably connect the platform relative to the housing assembly, the mounting assembly including a plurality of studs supported by one of the housing assembly and the platform, each stud having a ball end, and a corresponding plurality of mounts supported by the other of the housing assembly and the platform, each mount defining a recess having an open end, engaging including inserting the ball end of an associated stud in the recess through the open end to removably connect the platform.

Independent features and independent advantages of the invention may become apparent to those skilled in the art upon review of the following detailed description, claims and drawings.

BRIEF DESCRIPTION OF THE DRAWINGS

FIGS. 2A-2F are views of the scale of FIG. 1A and illustrating adjustment of the tray assembly.

FIGS. 4A-4J are partial cross-sectional views of a portion of the tray mounting assembly shown in FIGS. 3A-3D and illustrating engagement of the stud and the mount.

FIGS. 7A-7F are views of the tray assembly of the scale of FIG. 1A.

DETAILED DESCRIPTION

Figure 1A:
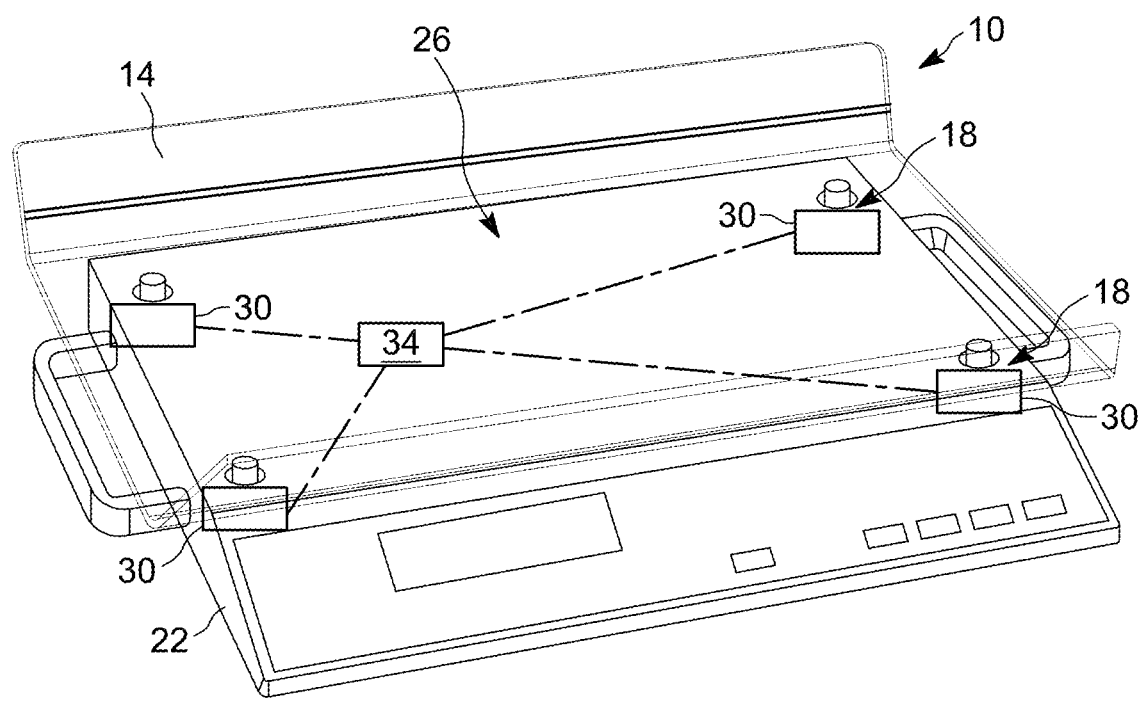
FIG. 1A is a perspective view of a scale including a tray assembly and a mounting assembly.

Before any independent embodiments of the invention are explained in detail, it is to be understood that the invention is not limited in its application to the details of construction and the arrangement of components set forth in the following description or illustrated in the following drawings. The invention is capable of other independent embodiments and of being practiced or of being carried out in various ways. Also, it is to be understood that the phraseology and terminology used herein is for the purpose of description and should not be regarded as limiting.

The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. In addition, the terms "connected" and "coupled" and variations thereof are not restricted to physical or mechanical connections or couplings.

Relative terminology, such as, for example, "about", "approximately", "substantially", etc., used in connection with a quantity or condition would be understood by those of ordinary skill to be inclusive of the stated value and has the meaning dictated by the context (for example, the term includes at least the degree of error associated with the measurement of, tolerances (e.g., manufacturing, assembly, use, etc.) associated with the particular value, etc.). Such terminology should also be considered as disclosing the range defined by the absolute values of the two endpoints. For example, the expression "from about 2 to about 4" also discloses the range "from 2 to 4". The relative terminology may refer to plus or minus a percentage (e.g., 1%, 5%, 10% or more) of an indicated value.

Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way but may also be configured in ways that are not listed.

Furthermore, some embodiments described herein may include one or more electronic processors configured to perform the described functionality by executing instructions stored in non-transitory, computer-readable medium. Similarly, embodiments described herein may be implemented as non-transitory, computer-readable medium storing instructions executable by one or more electronic processors to perform the described functionality. As used in the present application, "non-transitory computer-readable medium" comprises all computer-readable media but does not consist of a transitory, propagating signal. Accordingly, non-transitory computer-readable medium may include, for example, a hard disk, a CD-ROM, an optical storage device, a magnetic storage device, a ROM (Read Only Memory), a RAM (Random Access Memory), register memory, a processor cache, or any combination thereof.

Many of the modules and logical structures described are capable of being implemented in software executed by a microprocessor or a similar device or of being implemented in hardware using a variety of components including, for example, application specific integrated circuits ("ASICs"). Terms like "controller" and "module" may include or refer to both hardware and/or software. Capitalized terms conform to common practices and help correlate the description with the coding examples, equations, and/or drawings. However, no specific meaning is implied or should be inferred simply due to the use of capitalization. Thus, the claims should not be limited to the specific examples or terminology or to any specific hardware or software implementation or combination of software or hardware.

Figure 1B:
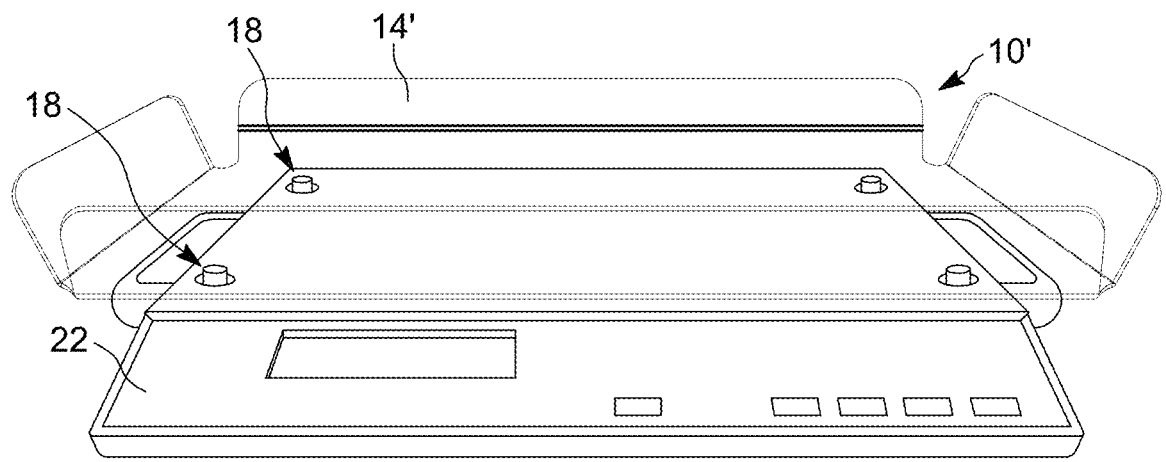
FIG. 1B is a perspective view of a scale including an alternative tray assembly with the mounting assembly.

FIG. 1A illustrates a scale 10, such as a medical scale (e.g., a neonatal or pediatric scale), including a removable tray assembly 14 and a mounting assembly 18 between the tray assembly 14 and a scale body 22; FIG. 1B illustrates a scale 10' with an alternative four-sided tray assembly 14'. The tray assembly 14 is removable, for example, for cleaning and sanitizing, for adjustment of components in the scale body 22 (e.g., replacement of batteries), transport, storage, etc. The illustrated mounting assembly 18 may facilitate and provide flexibility in removal and installation of the tray assembly 14 (e.g., the tray assembly 14 can be misaligned and/or angled relative to the body 22), inhibit damage to the components (e.g., the mount(s) 62, the stud(s) 70, etc.) maintain a suitable connection between the tray assembly 14 and the base 22, etc.

Figure 6A:
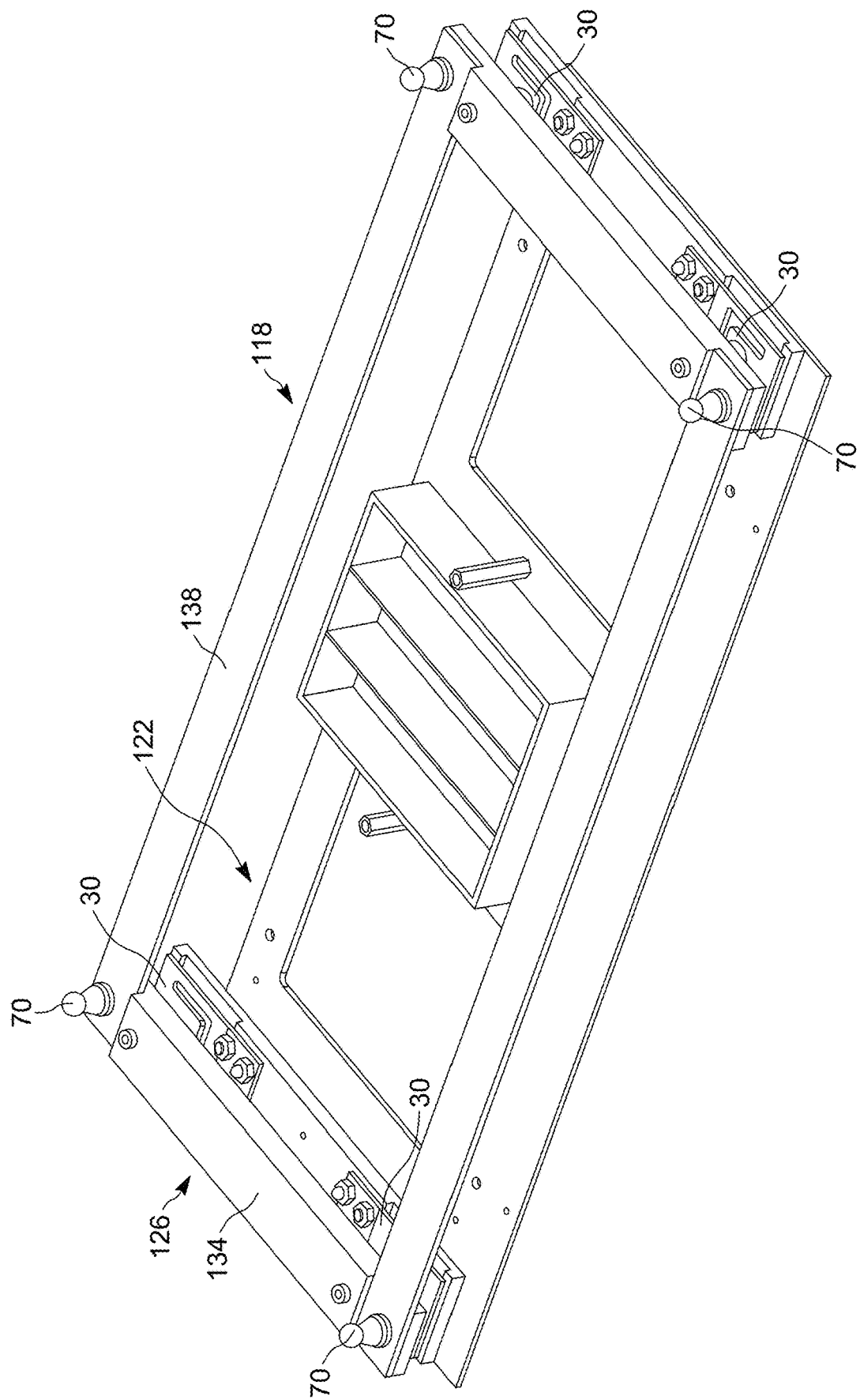
FIGS. 6A-6G are views of a mounting chassis of the scale of FIG. 1A.
Figure 6B:
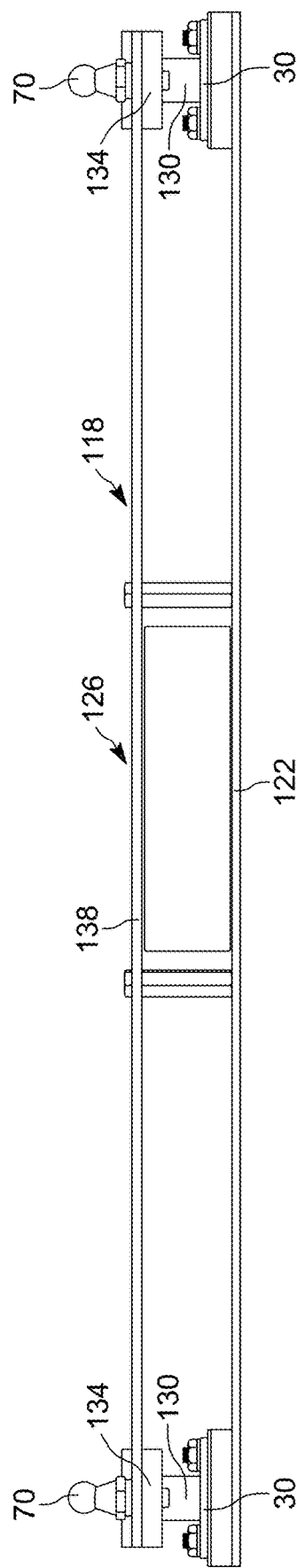
Figure 6C:
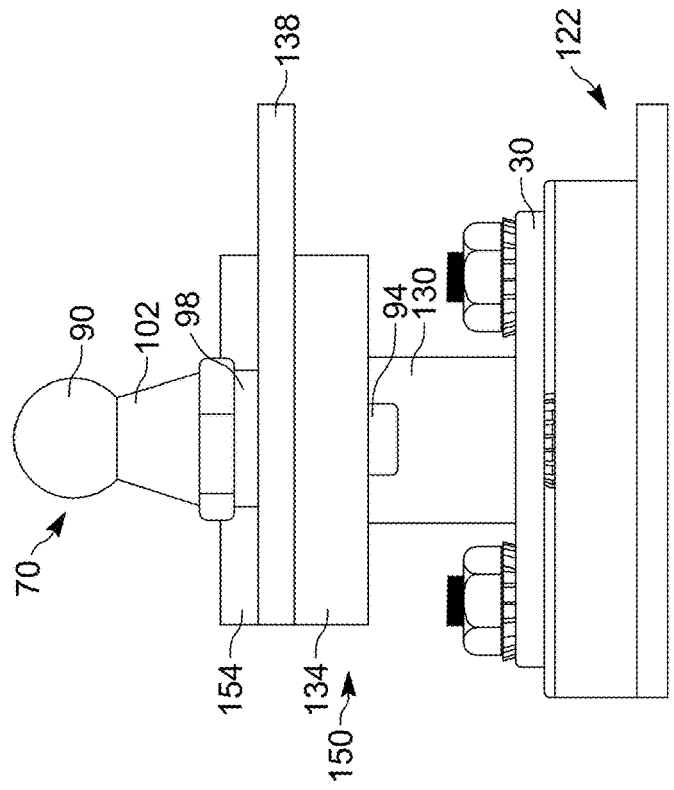
Figure 6D:
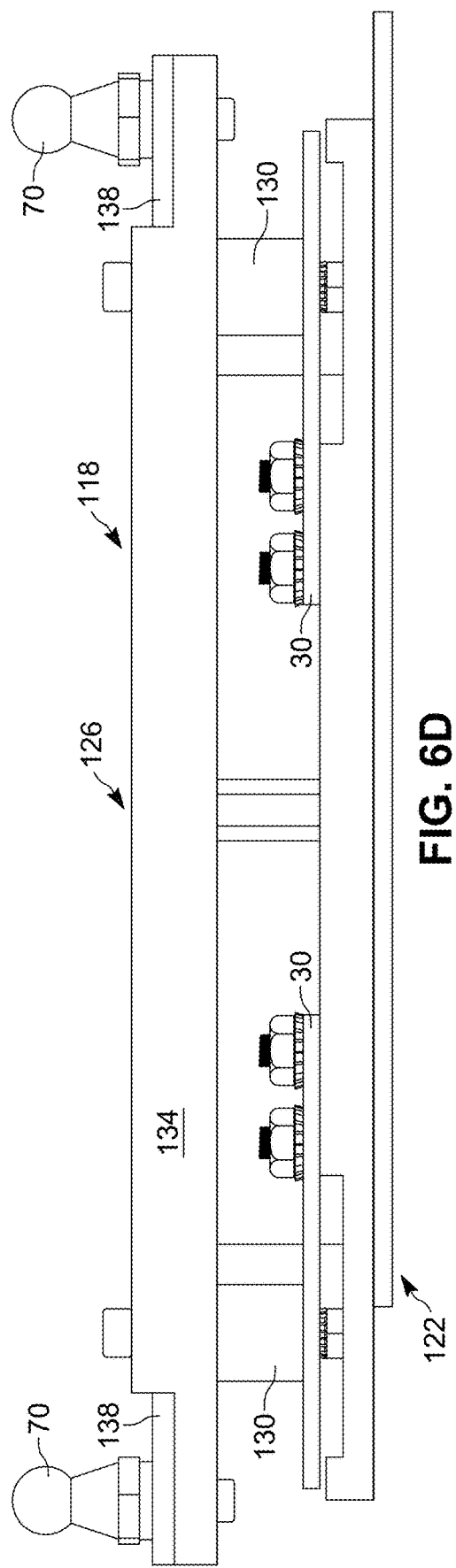
Figure 6E:
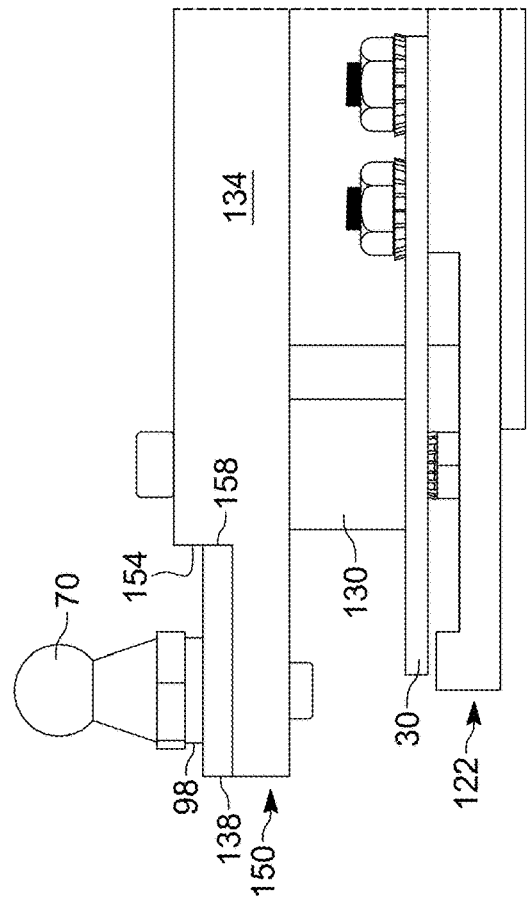

As schematically illustrated in FIG. 1A, the scale 10 includes, supported in the body 22, weighing circuitry 26 with a weight sensor (e.g., one or more load cells 30 (see FIG. 6A)) and an electronic processor 34. As shown in FIGS. 2A-2F, the body 22 includes a housing assembly 38 supportable on a work surface S, such as a table, cart, or the floor (e.g., by leveling feet 42). The housing assembly 38 includes a base 46 and a removable cover 50 (having openings 52) connected by fasteners (not shown). Handles 54 attached to the base 46 are used to transport the scale 10. Components of the scale body 22, such as the tray assembly 14, the handles 54, metal parts, etc., have antimicrobial properties (e.g., due to materials of the component or coatings).

Figure 9:
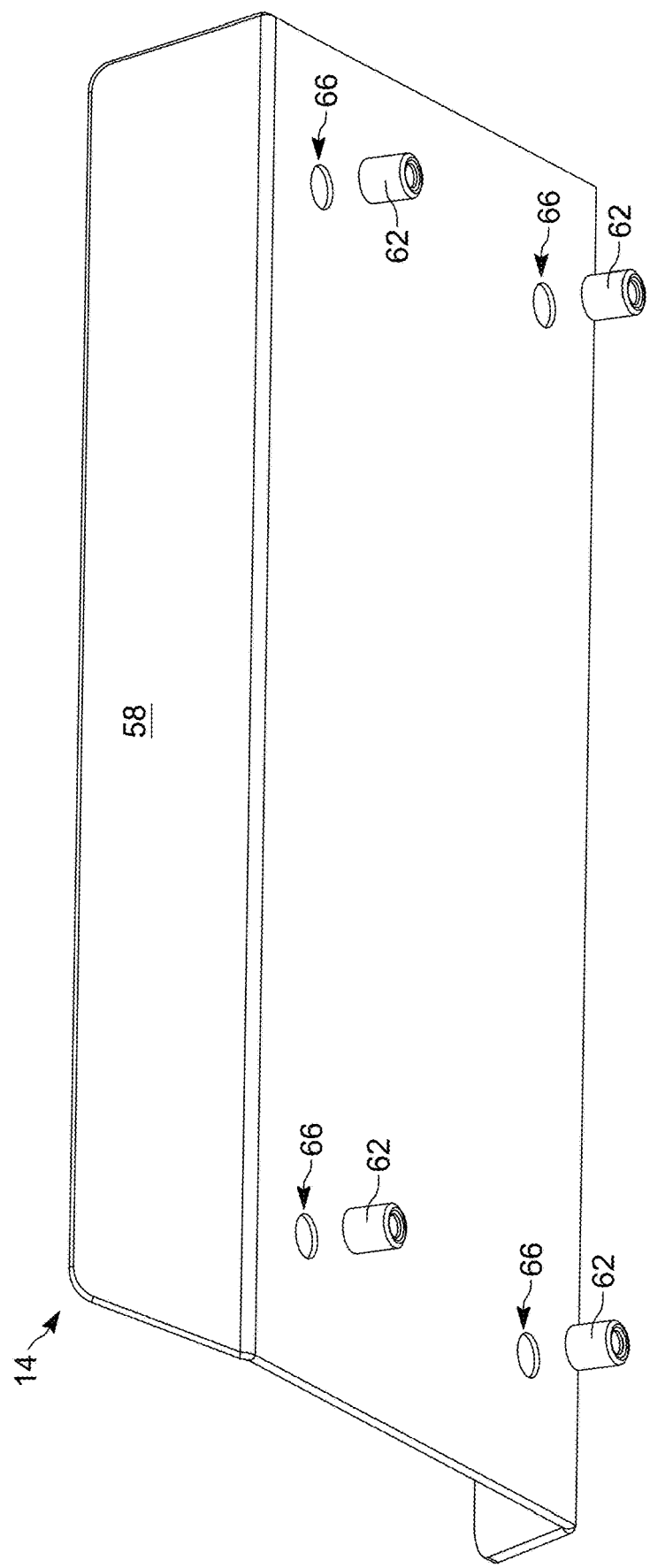
FIG. 9 is an exploded view of the tray assembly shown in FIGS. 7A-7F.
Figure 10C:
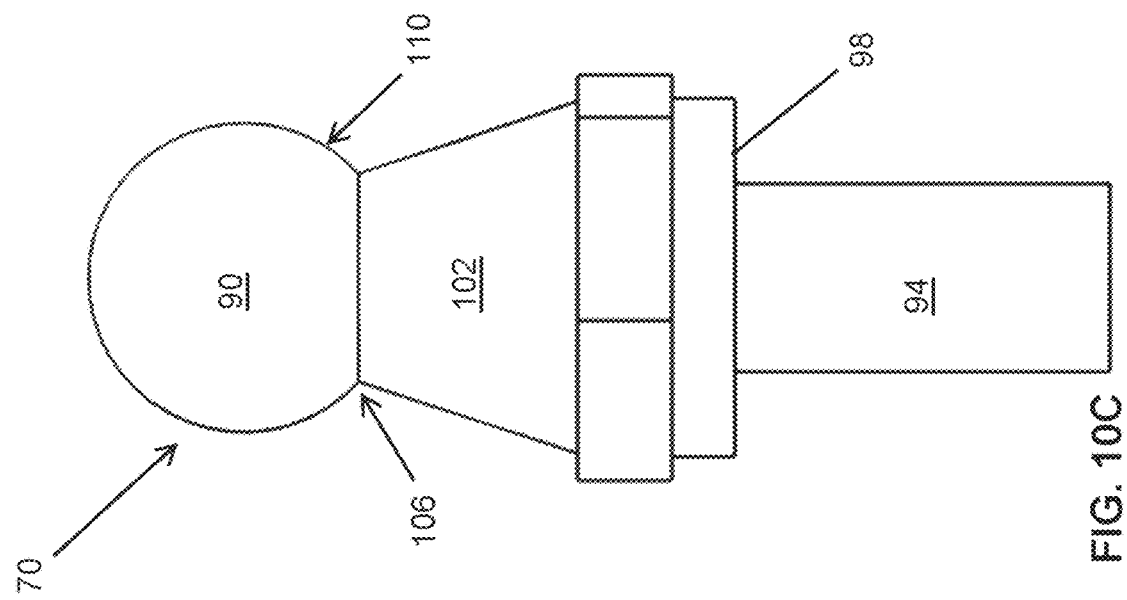
FIGS. 10A-10C are views of the stud shown in FIGS. 4A-4J.
Figure 10B:
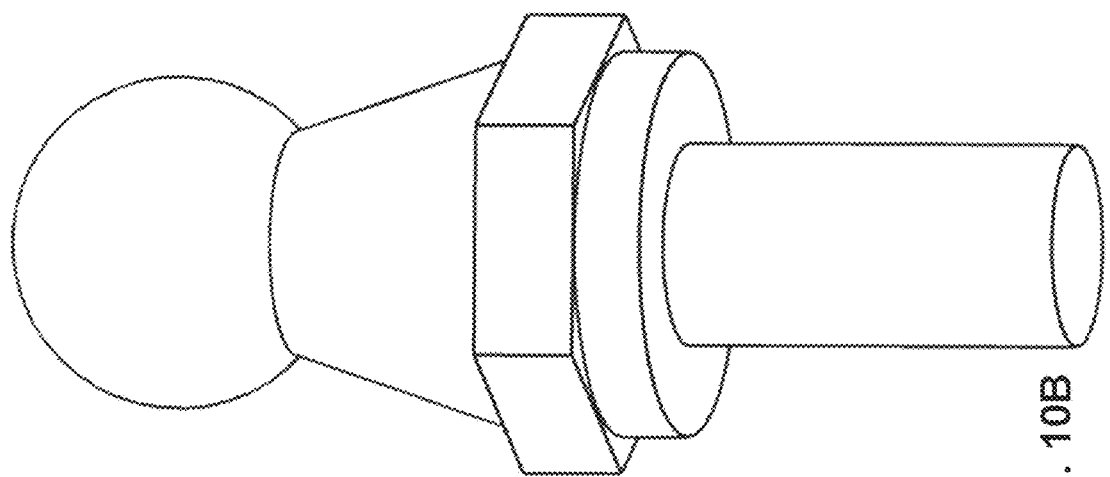
Figure 10A:
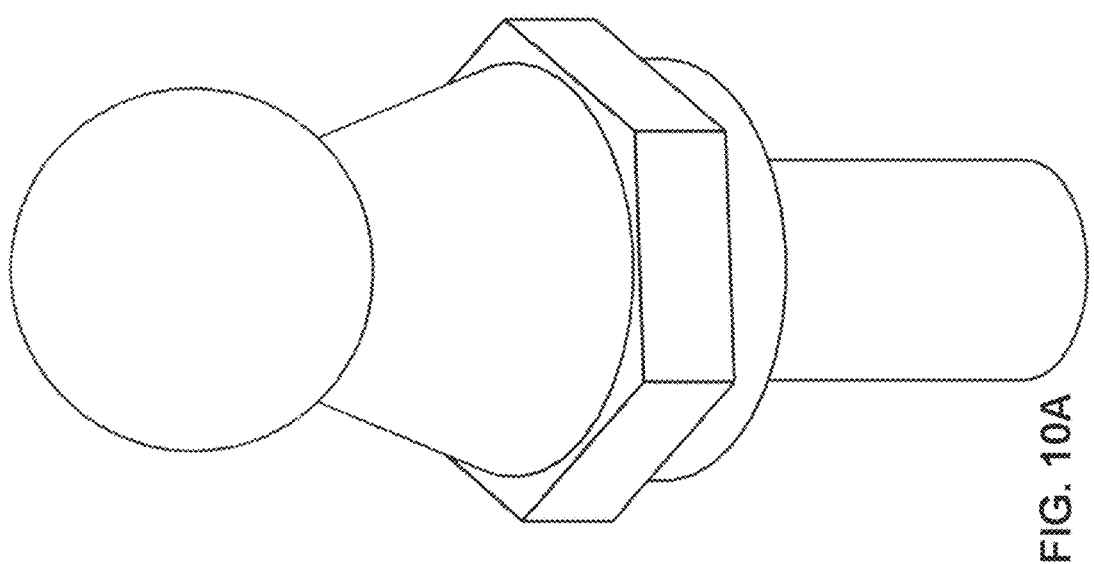
Figure 11B:
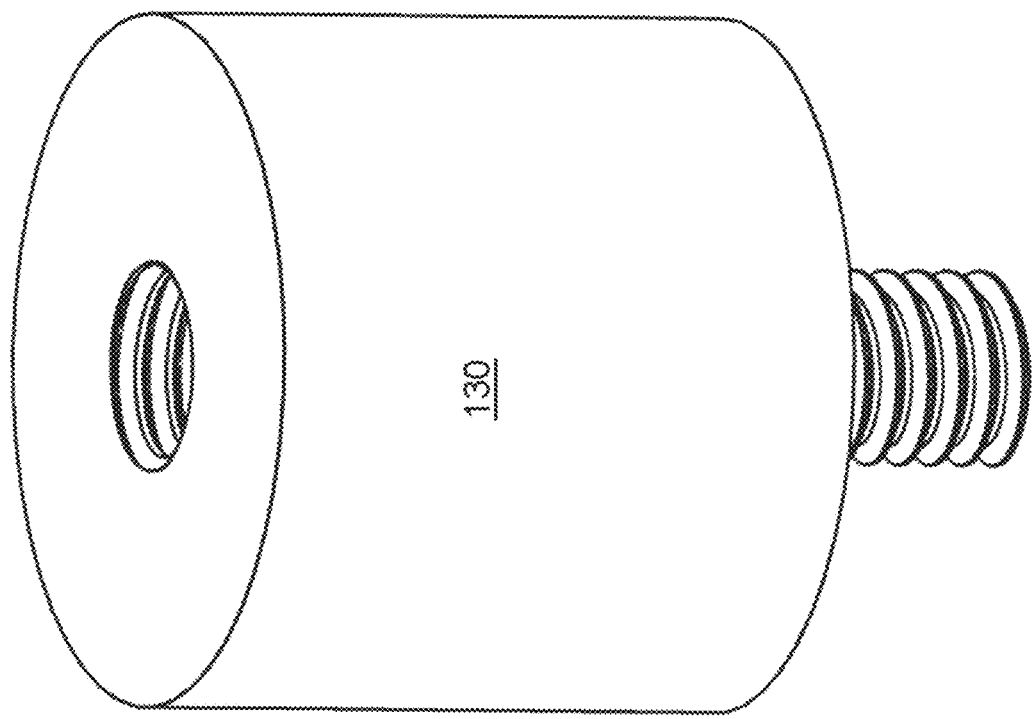
FIGS. 11A-11B are perspective views of an isolation member of the mounting chassis shown in FIGS. 6A-6G.
Figure 11A:
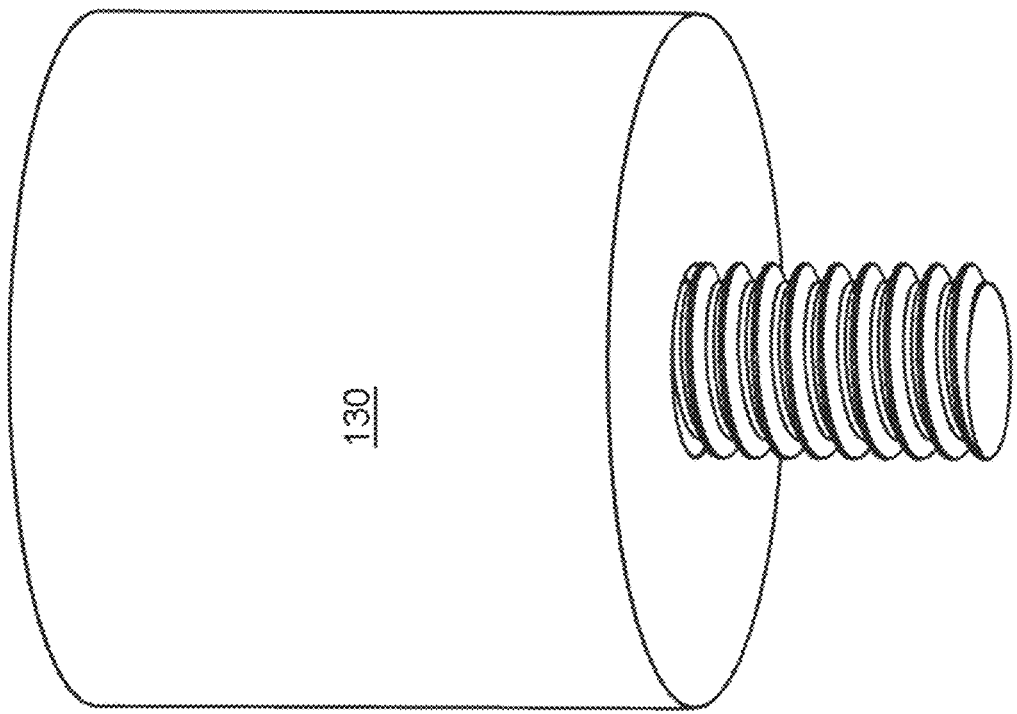
Figure 12:
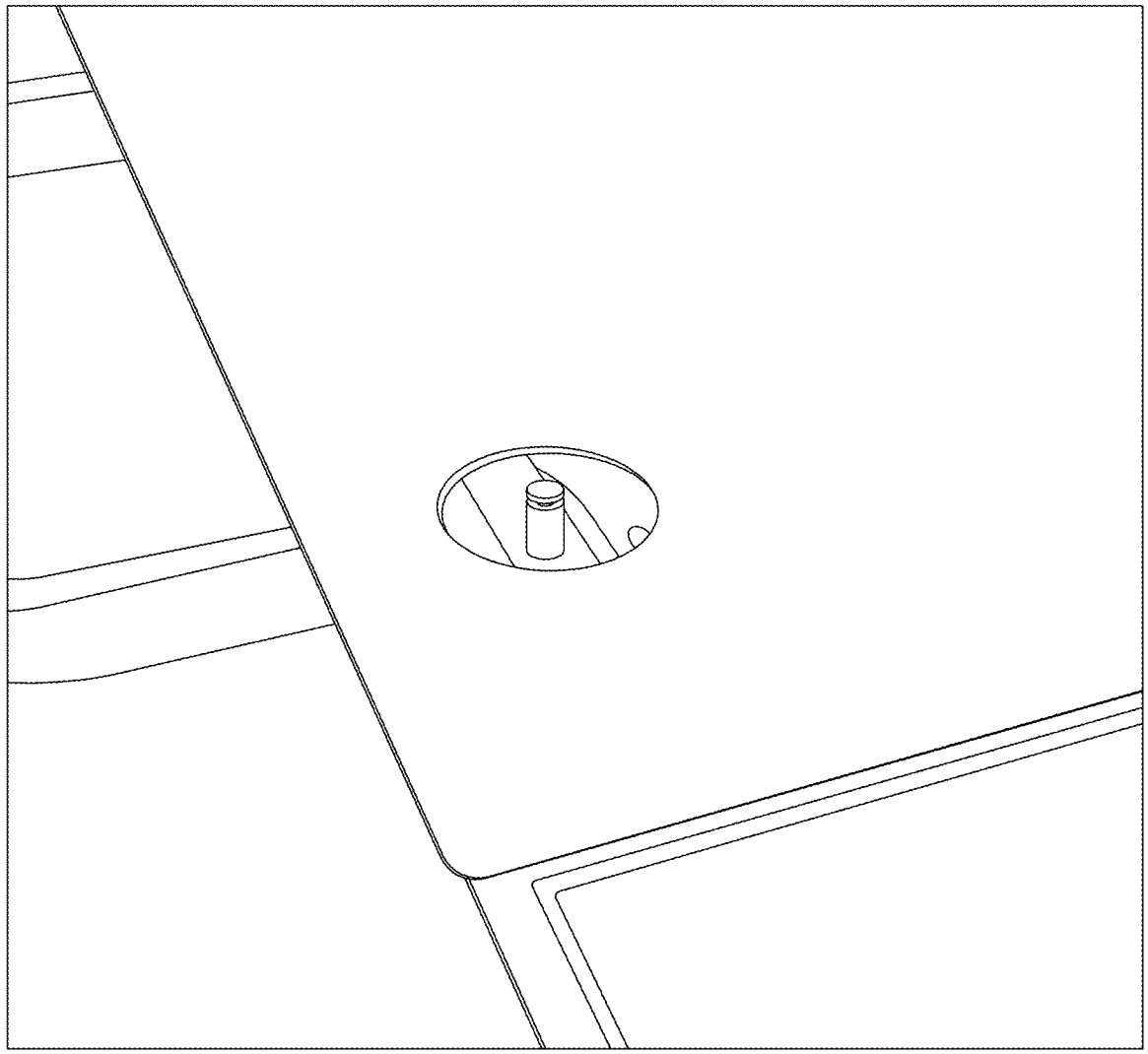
FIG. 12 is a photograph a portion of a prior art tray mounting assembly and illustrating the pin.

The tray assembly 14 includes a support, platform or tray base 58 on which an object to be weighed (e.g., a human) is supported. A force on the tray base 58 (e.g., the weight of the object) will be applied to the weight sensor. A number of mounts 62 (four shown in FIGS. 2C and 9) are connected (e.g., via adhesive, welding, etc.) to the tray base 58 with mount ends positioned in respective counterbores 66.

In the illustrated construction, the tray base 58 is formed of a thermoplastic material, such as, for example, acrylic, Acrylonitrile butadiene styrene (ABS), KYDEX®, sold by SEKISUI KYDEX, Bloomsburg, Pennsylvania, USA, etc. The illustrated tray base 58 is, for example, durable, easy-to-clean, holds up to disinfectants and cleaning materials, and has antimicrobial characteristics, while being comfortable to the patient. The tray base 58 is provided as a sheet, cut to size and heat formed into, for example, the shapes shown in FIGS. 1A-1B. Each illustrated mount 62 is formed from a rod of acrylic, ABS, etc., and is bonded to the tray base 58 with acrylic adhesive The tray mounting assembly 18 includes (see FIGS. 3A-4J), the mounts 62 on the tray base 58, a corresponding number of complementary studs 70 (e.g., four) on the scale body 22, and a retainer assembly 74. It should be understood that, in other constructions (not shown), one or more of the mounts 62 and the studs 70 may be supported on the other of the tray base 58 and the scale body 22.

As shown in FIG. 4E, each mount 62 defines a bore 78 with an open end have a lead-in taper 82 (e.g., at an angle of between about 30° and about 60° relative to the bore axis (about 45°, as shown)) and a groove 86 spaced from the open end.

Each stud 70 has (see FIG. 4E) a free end with a ball 90 and a post 94 at the opposite end. A support base 98 is adjacent the post 94, and a taper 102 (e.g., at an angle of between about 10° and about 25° relative to the stud axis (about 17.3°, as shown)) extends from the support base 98 to the ball 90. A retainer recess 106 is defined on the stud 70 at the interface between the ball 90 and the taper 102, and the inward end of the ball 90 provides a retainer surface 110. Each illustrated stud 70 includes a metal stud base with a plastic overmold (e.g., acrylic, ABS, etc.) providing the ball 90. As illustrated, the overmold also provides the base 98 and the taper 102.

The retainer assembly 74 includes a retainer member (e.g., an O-ring 114). The O-ring 114 is received and held in the groove 86 in the mount 62. When the stud 70 is inserted into the bore 78 (see FIG. 4A), the O-ring 114 engages in the recess 106 in the stud 70 and will apply a retaining force against the surface 110 to inhibit removal of the stud 70 from the mount 62 (see FIG. 4B).

FIGS. 4A-4E illustrate removal of a stud 70 from a corresponding mount 62 and, in reverse, illustrate insertion of the stud 70 into the mount 62. As shown in FIG. 4F, the stud 70 may be inserted/removed offset from the axis of the bore 78. In such instances, the tray assembly 14 is laterally shifted (see FIG. 2D) relative to the scale body 22 compared to the installed position (see FIGS. 2A and 3A-3D).

FIGS. 4G-4J illustrate insertion of the stud 70 into the corresponding mount 62 and, in reverse, illustrate remove of the stud 70 from the mount 62. In FIGS. 4G-4J, the stud 70 is inserted/removed at an angle relative to the axis of the bore 78 (along with offset from the bore axis). In such instances, the tray assembly 14 is at an angle (see FIGS. 2B-2C) relative to the scale body 22 compared to the installed position (see FIGS. 2A and 3A-3D).

Figure 4G:
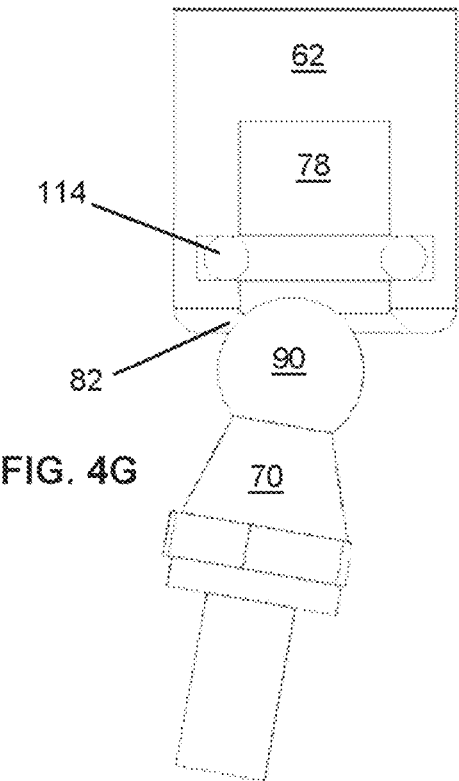
Figure 4H:
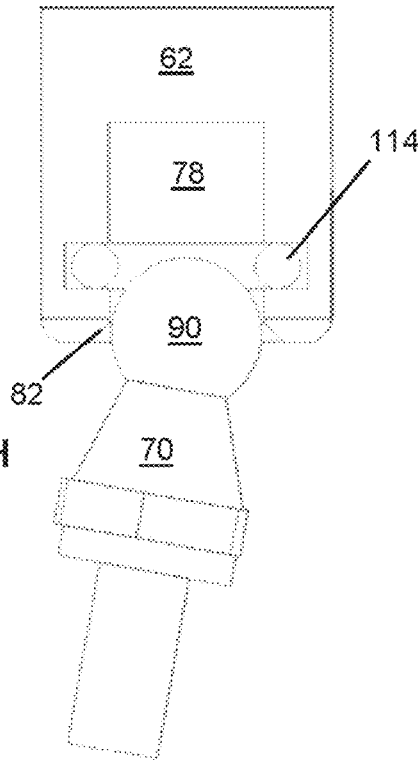
Figure 4I:
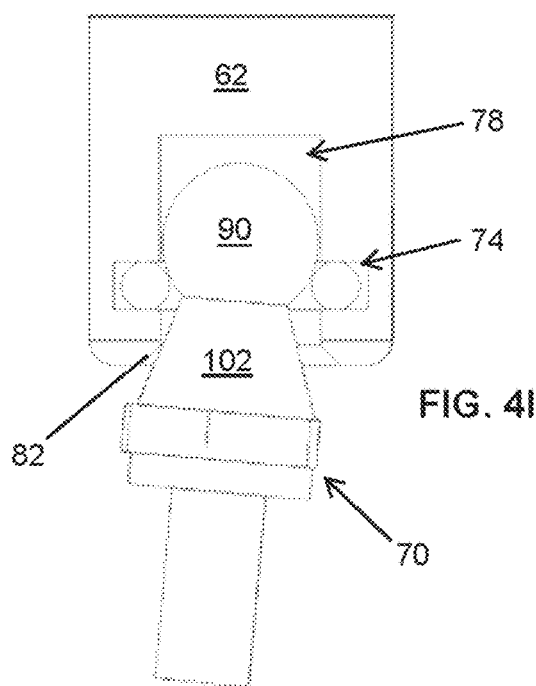
Figure 4J:
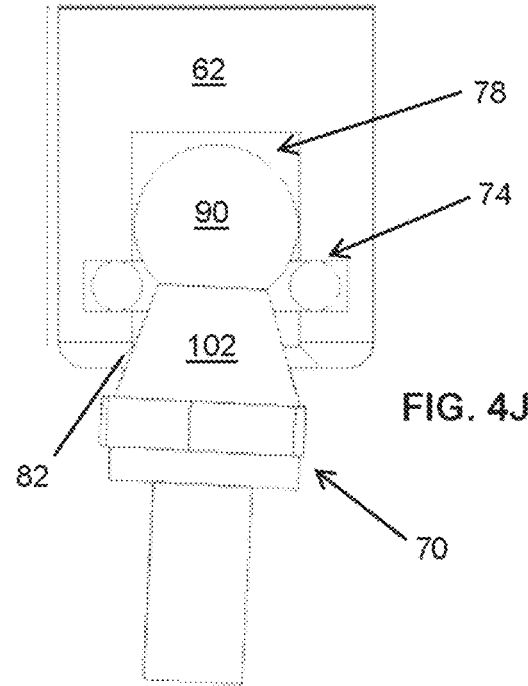
Figure 5A:
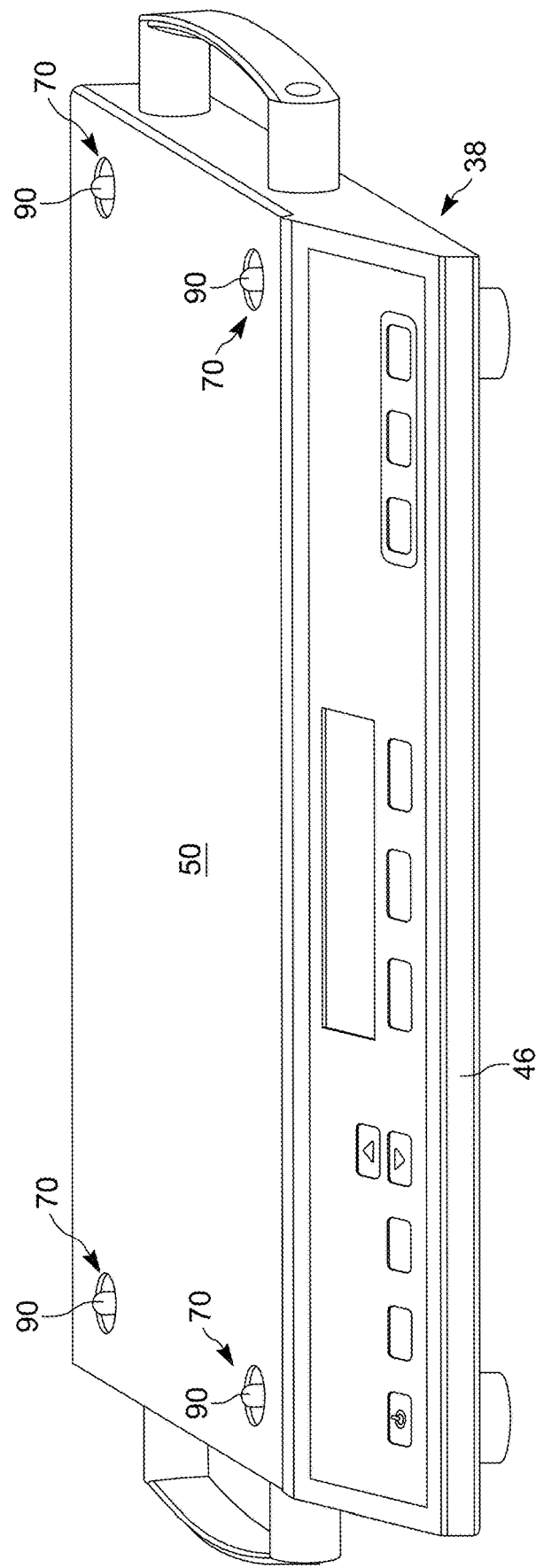
FIGS. 5A-5E are views of a scale body of the scale of FIG. 1A and illustrating a portion of the tray mounting assembly.
Figure 5B:
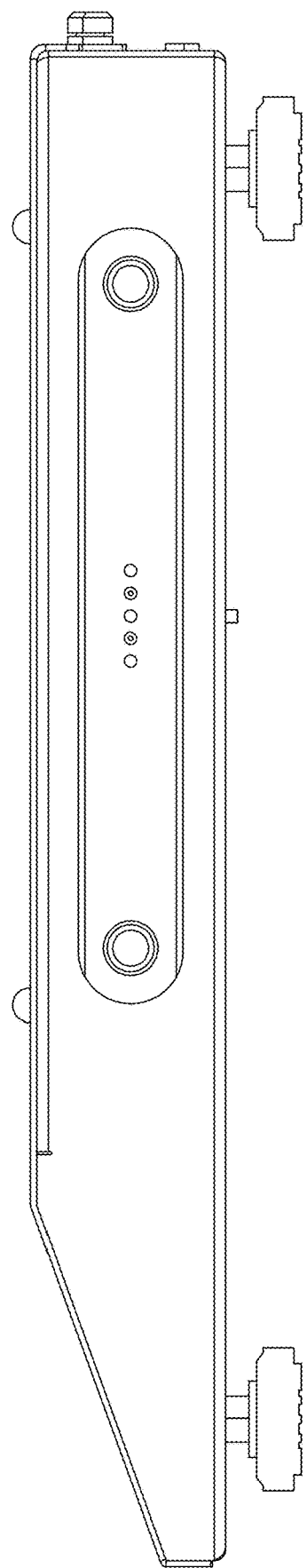
Figure 5C:
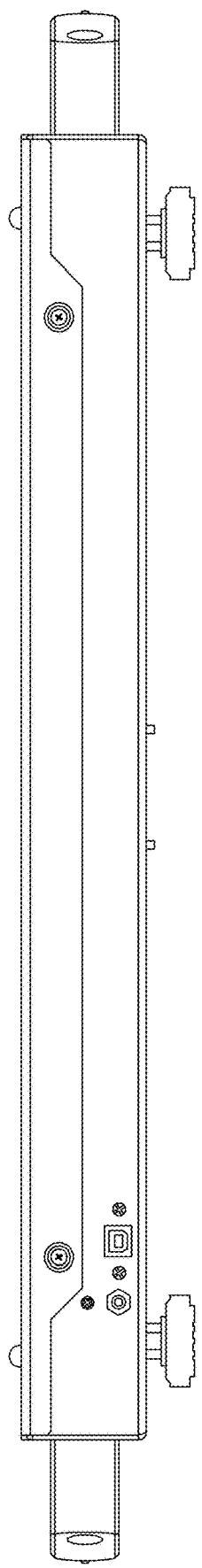
Figure 5D:
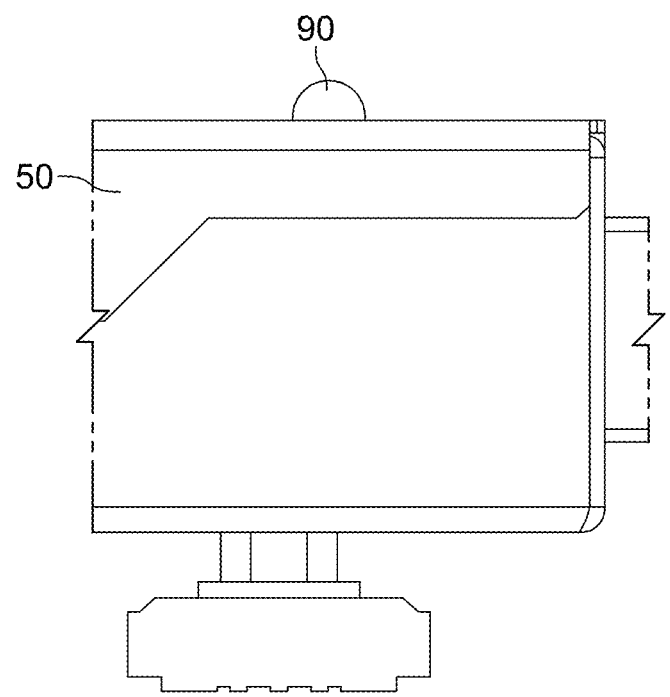
Figure 5E:
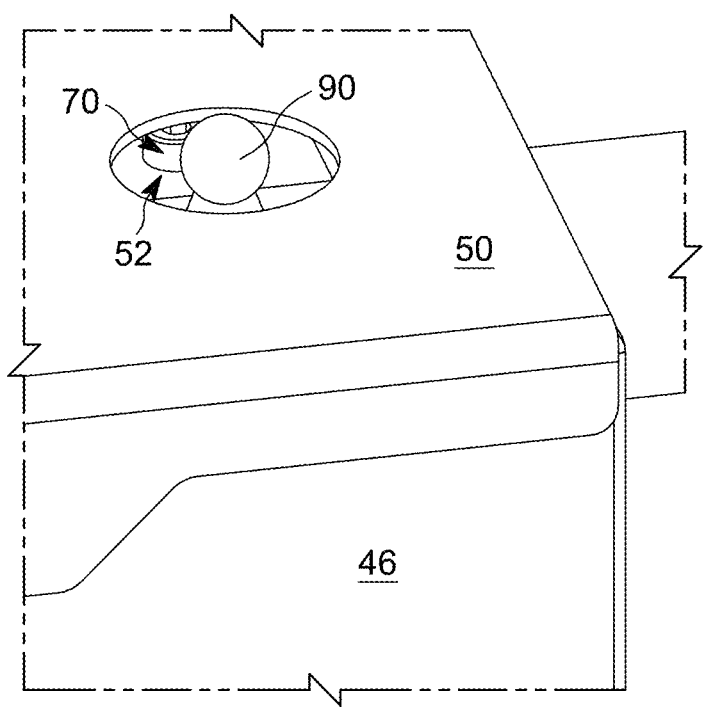

As shown in FIGS. 4G-4H, the taper 82 on the mount 62 and the curved surface of the ball 90 cooperate to move the stud 70 in line with the bore 78. As shown in FIGS. 4I-4J, the taper 102 on the stud 70 will further cooperate to align the stud 70 (to the position shown in FIG. 4A). When the stud 70 is installed, the end of the ball 90 engages the base of the bore 78 to provide a defined area of engagement between the tray assembly 14 and the scale body 22 for accuracy of weight measurement.

Figure 2A:
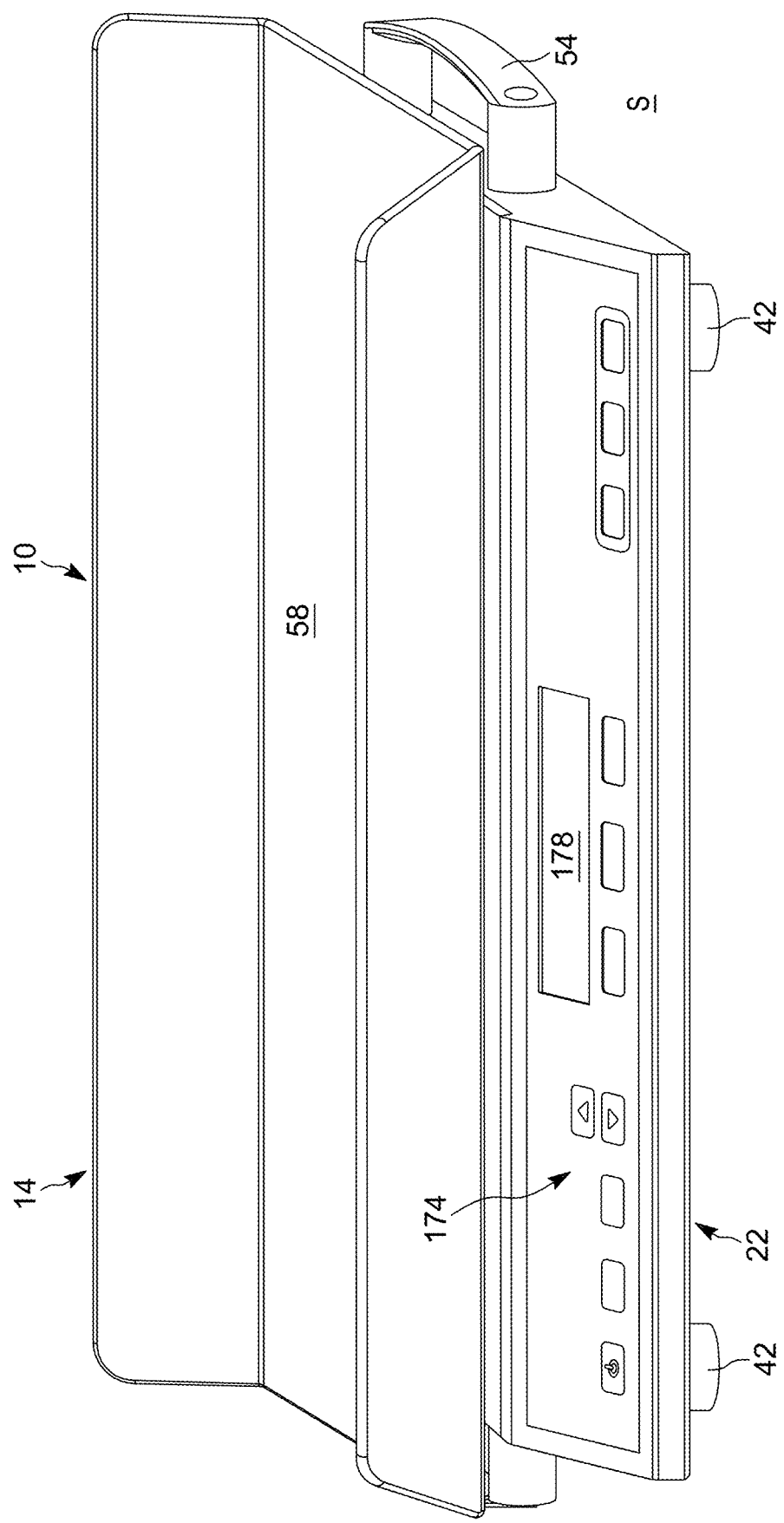
Figure 2B:
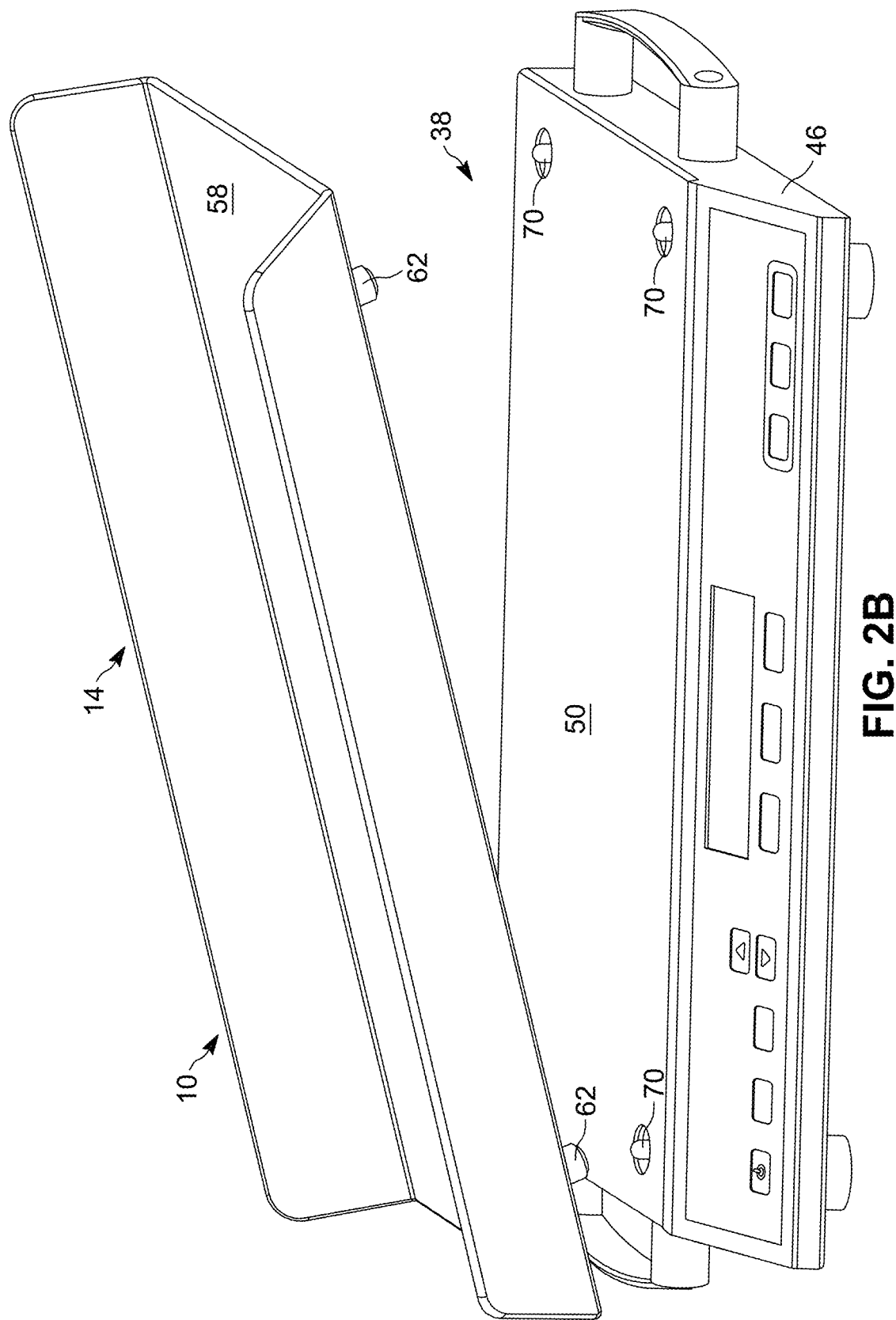
Figure 2C:
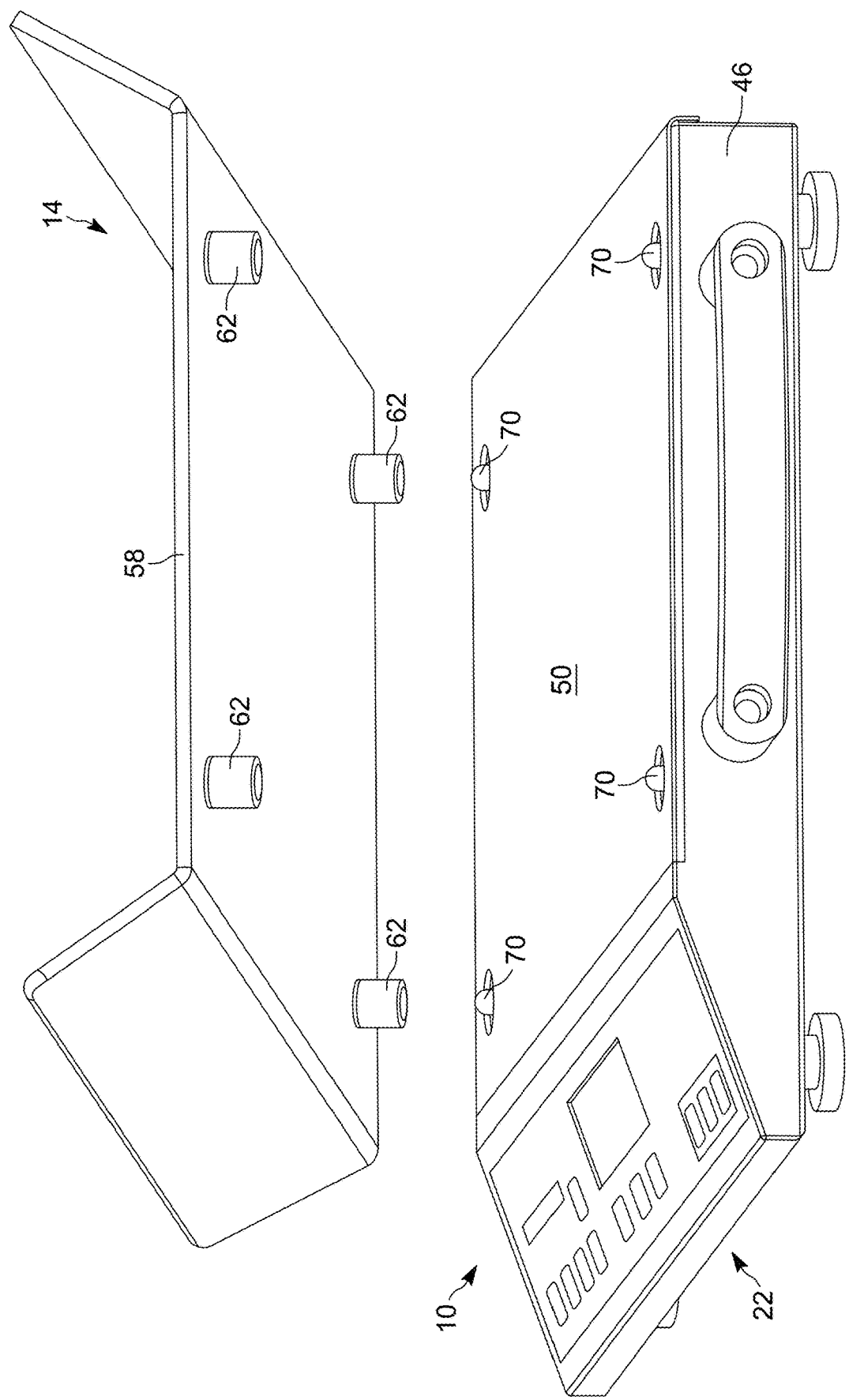
Figure 2D:
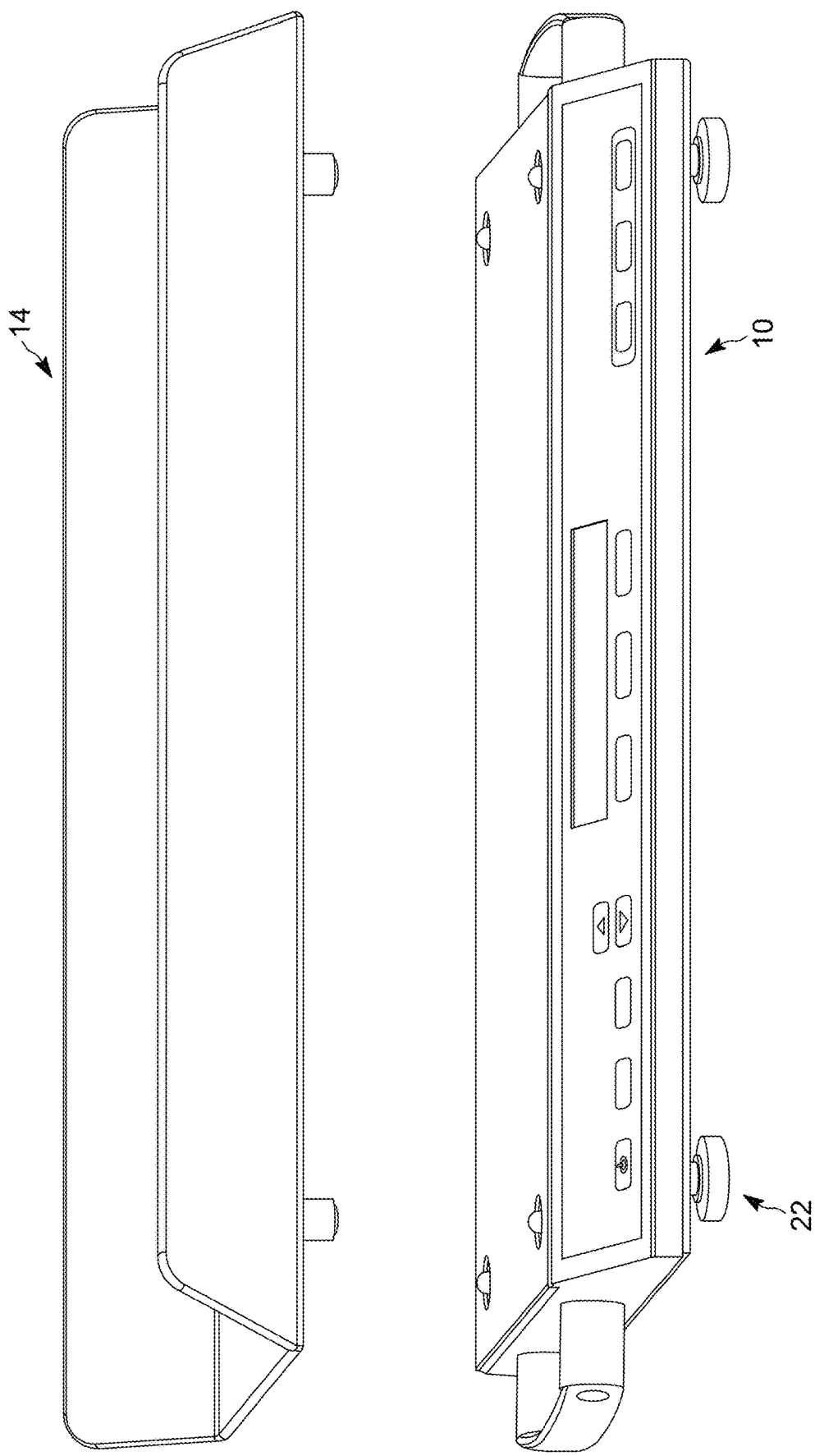
Figure 2E:
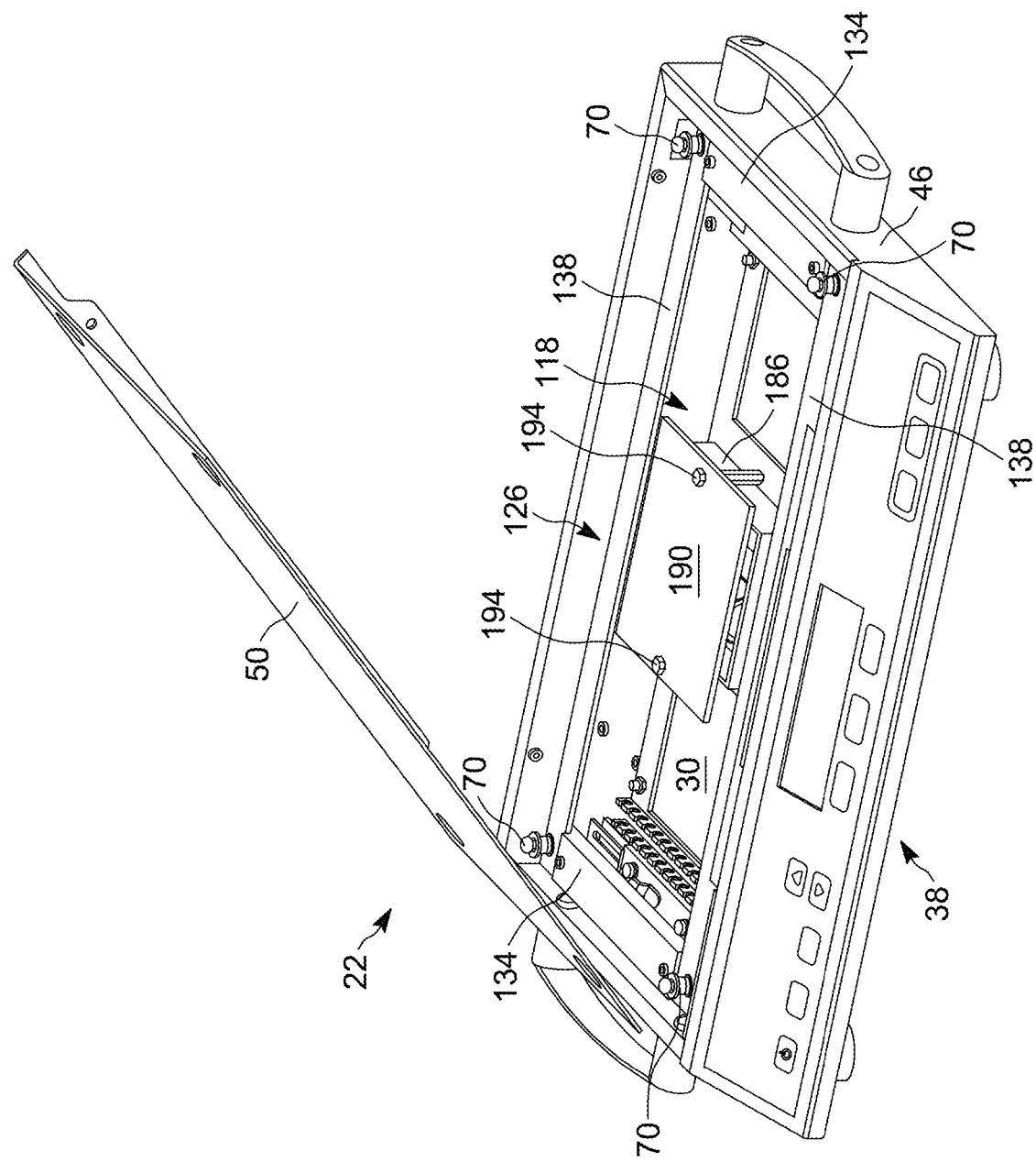
Figure 3A:
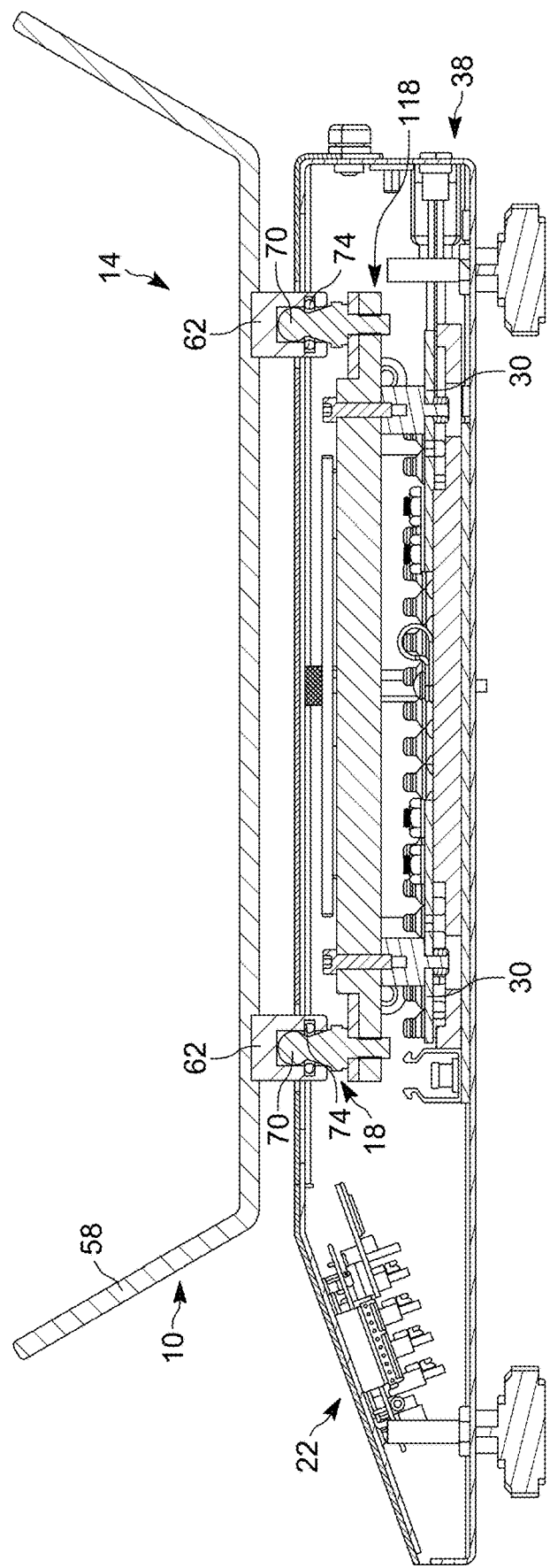
FIGS. 3A-3D are cross-sectional views of the scale of FIG. 1A and illustrating engagement of the tray mounting assembly.
Figure 3B:
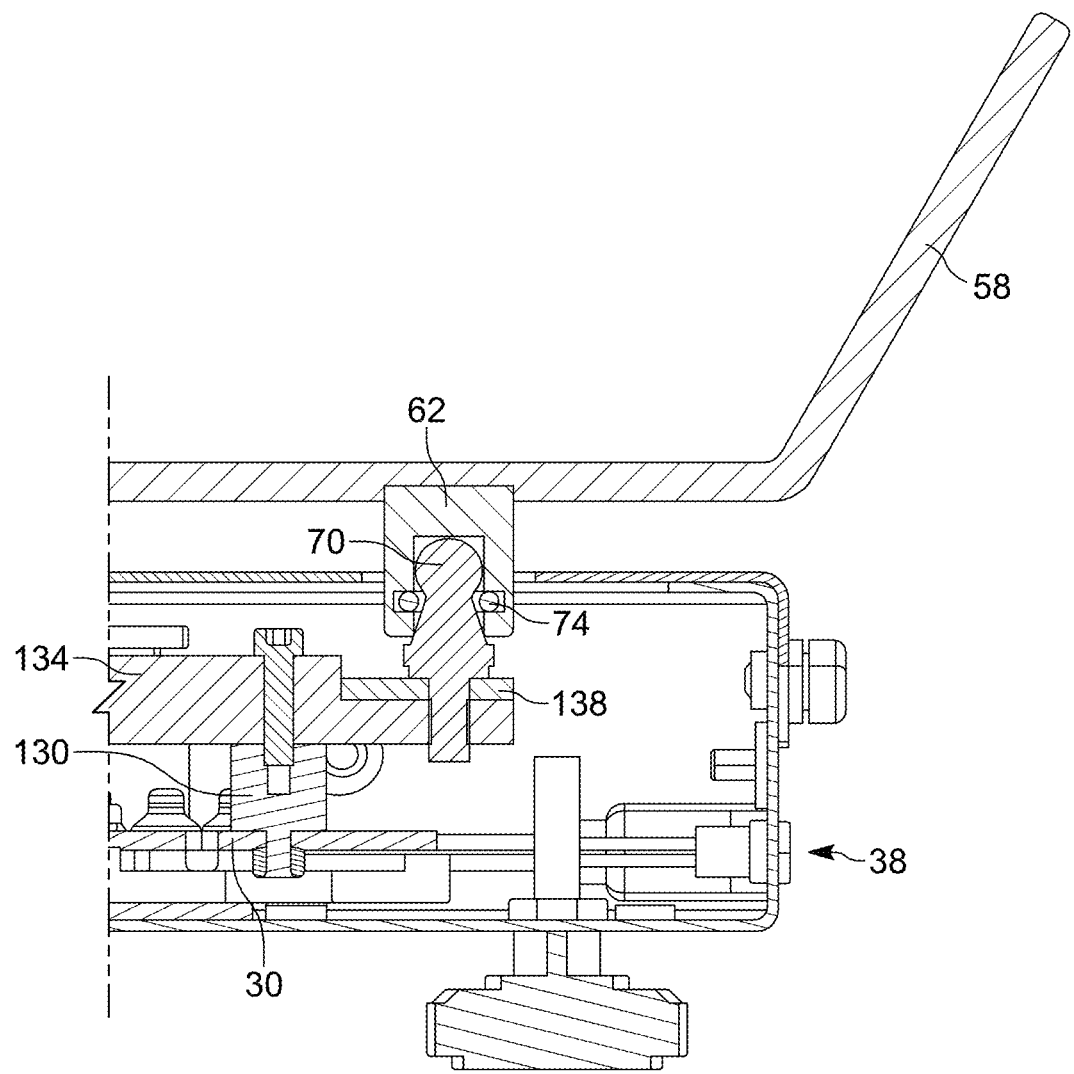
Figure 3C:
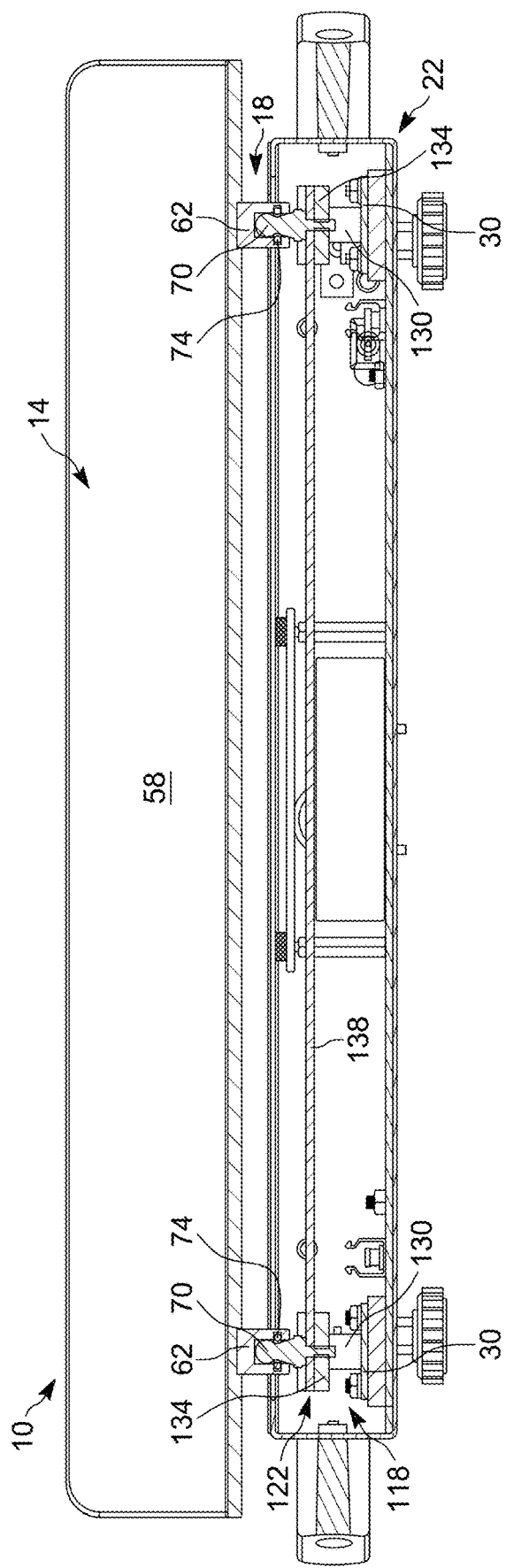
Figure 3D:
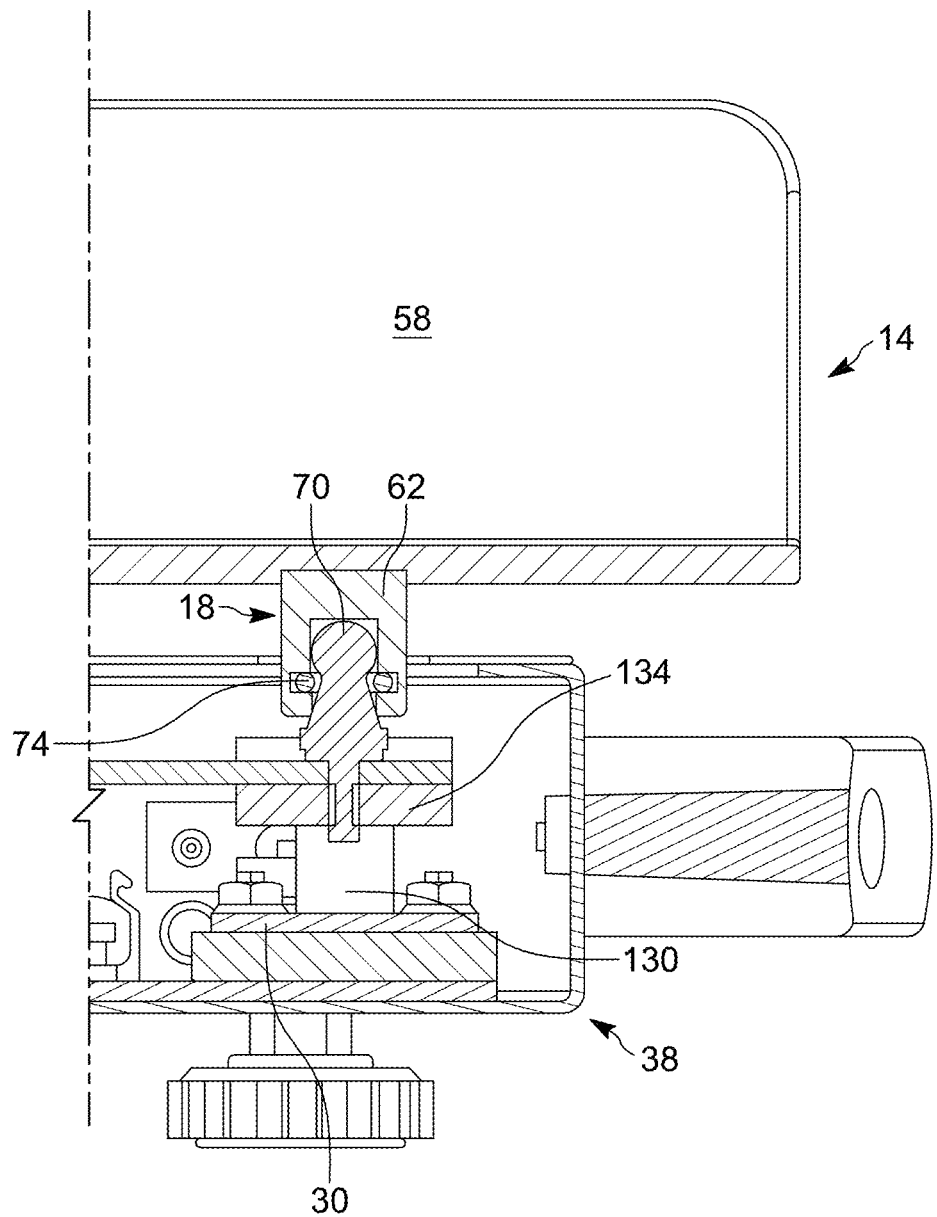

As shown in FIGS. 2E-2F, a chassis 118 supports the studs 70 and the load cells 30. The chassis 118 is shown in more detail in FIGS. 6A-6G. The chassis 118 includes a plate assembly 122 supporting the load cells 30 and a frame assembly 126 supporting the studs 70. The frame assembly 126 is connected to each load cell 30 by a load cell isolation mount 130.

The frame assembly 126 includes one or more mounting bars 134 (two in the illustrated construction) and one or more mounting supports or crossbars 138 (also two in the illustrated construction) arranged in a generally rectangular "picture frame" configuration. It should be understood that, in some independent aspects, the frame assembly 126 may be incorporated with a mounting assembly (not shown) different than the illustrated mount-stud mounting assembly 18 with a removable or non-removable tray assembly (not shown).

At opposite ends, the mounting bars 134 and the crossbars 138 include (see FIGS. 6F-6G) respective openings 142, 146 aligned to receive the post 94 of the associated stud 70 with the support base 98 on the crossbar 138. Each post 94 and opening 142 has complementary threads, and thread-locking compound is used to fix the studs 70 to the chassis 118.

The mounting bars 134 have a notched or narrowed portion 150 at each end over which an end of the crossbar 138 extends. Engagement of the posts 94 along with inter-engaging surfaces 154, 158 in the notched portion 150 inhibit relative pivoting movement of the mounting bars 134 and the crossbars 138 to maintain the rectangular shape of the frame assembly 126.

The notched portion 150 reduces the height of the studs 70 which, as shown in FIGS. 5A-5E, project through the respective cover openings 52 to a height above the cover 50 equal to about the radius of the ball 90. As shown in FIGS. 3A-3D, each mount 62 projects through a corresponding opening 52 to engage the associated stud 70 with engagement of the retainer assembly 74 being below the cover 50.

Figure 6F:
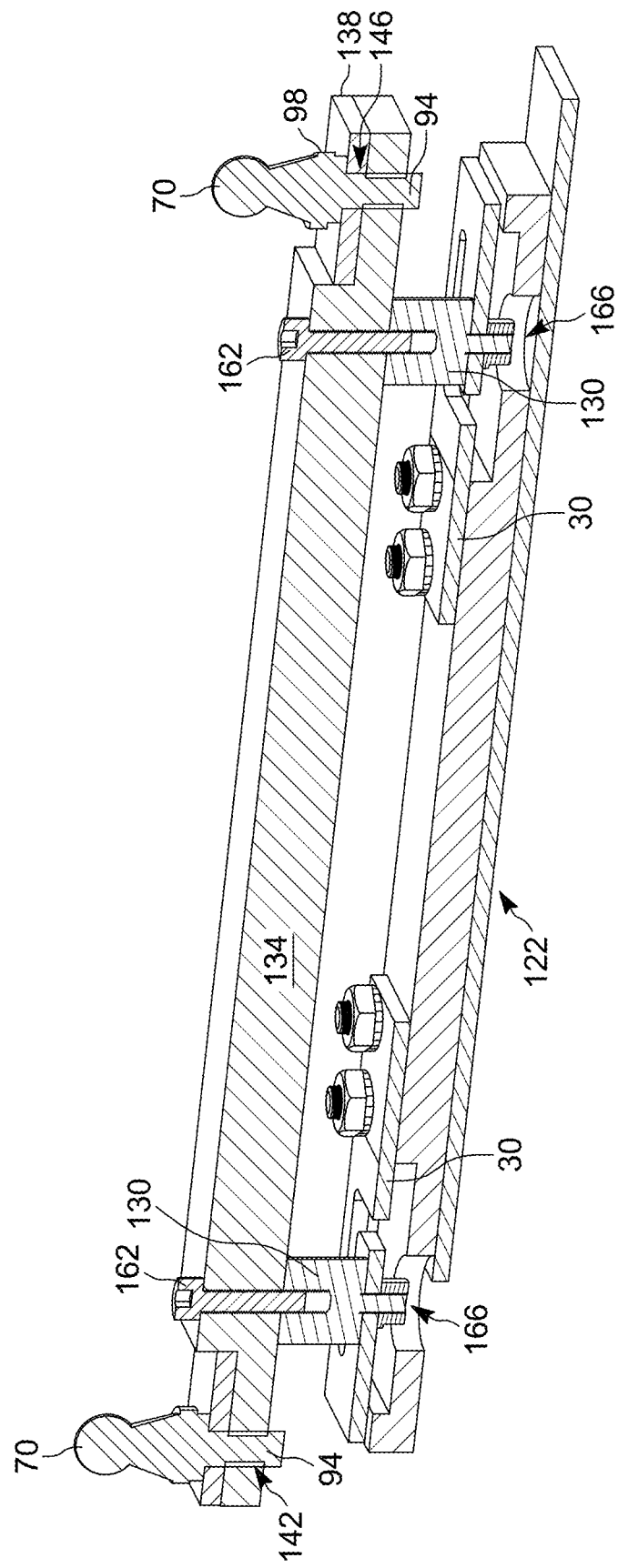
Figure 6G:
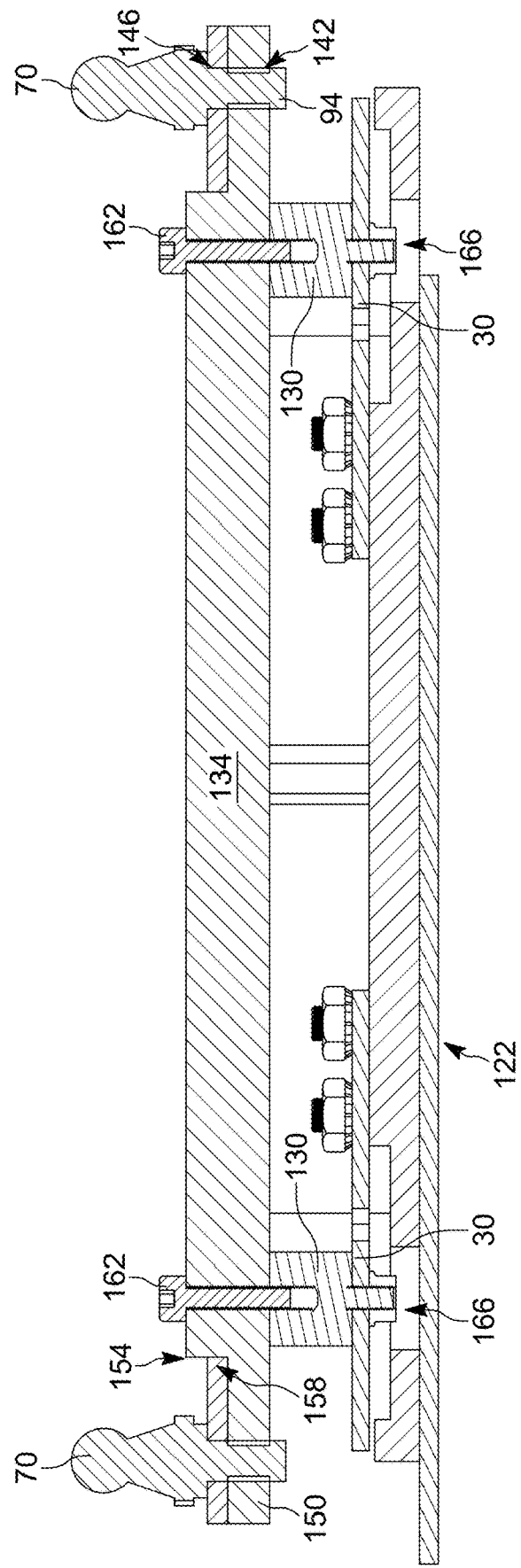
Figure 7A:
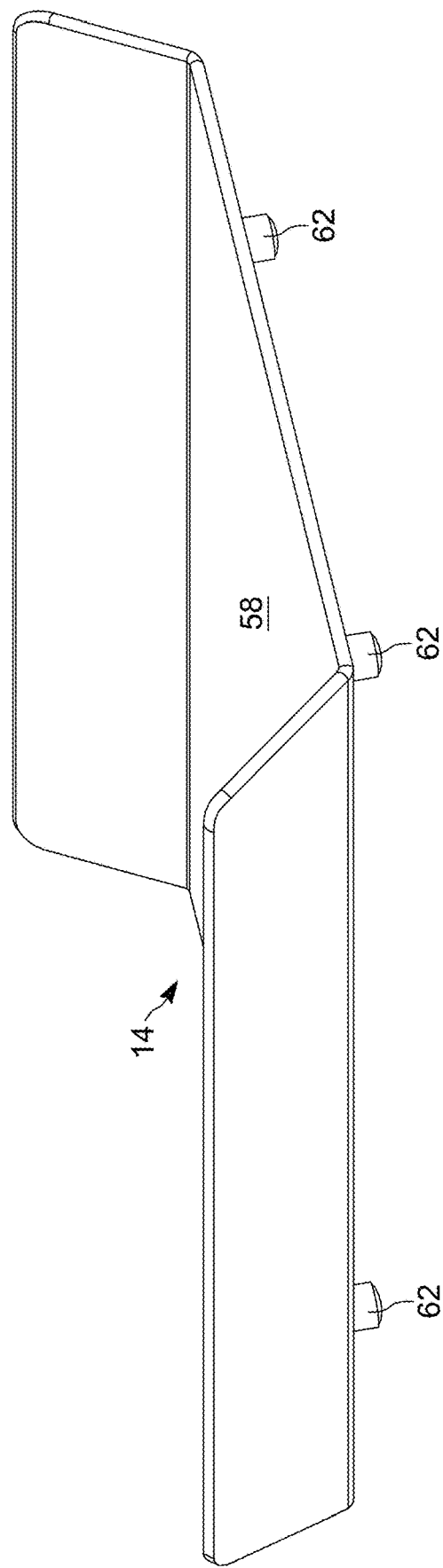
Figure 7C:
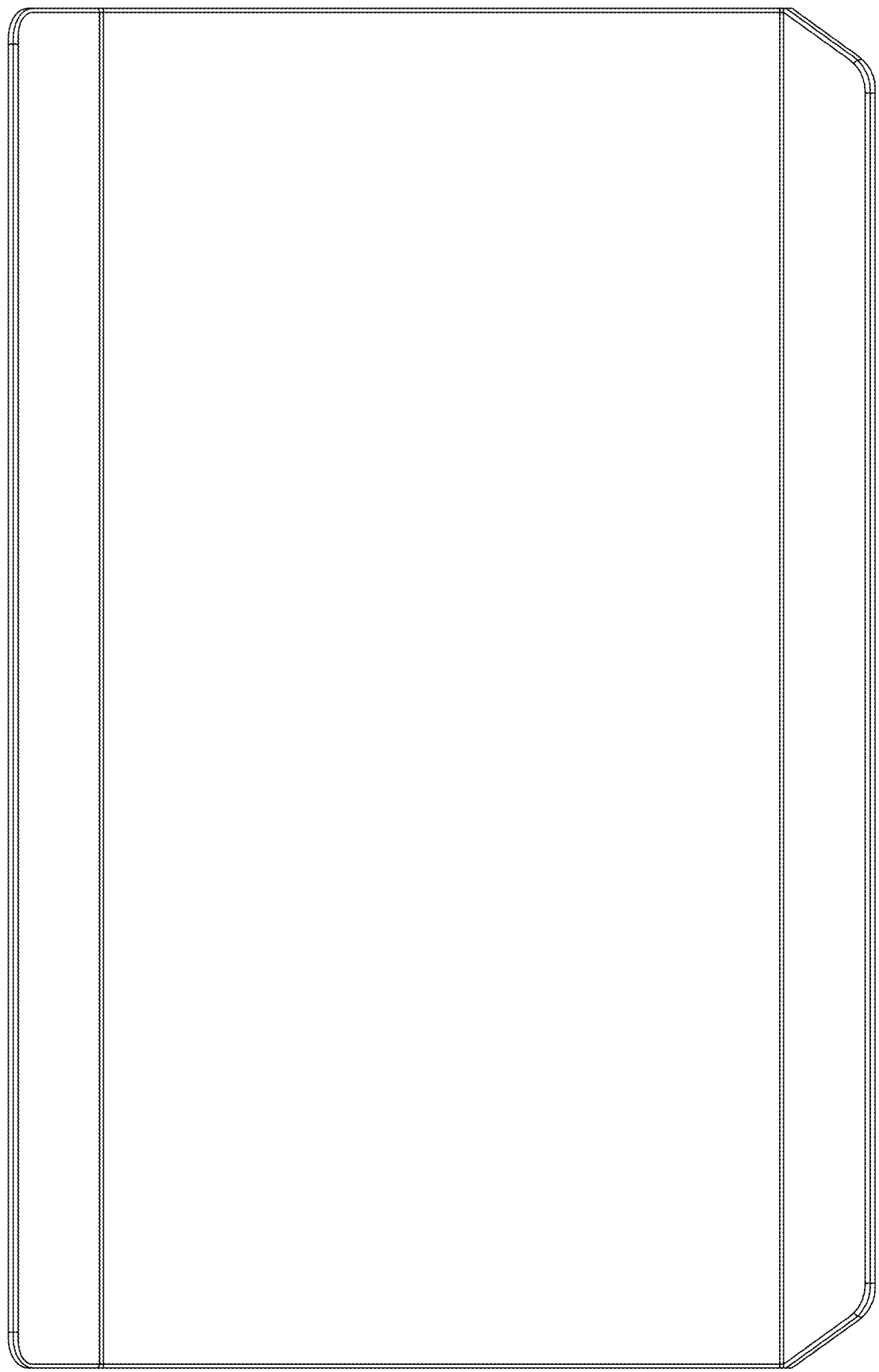
Figure 7D:
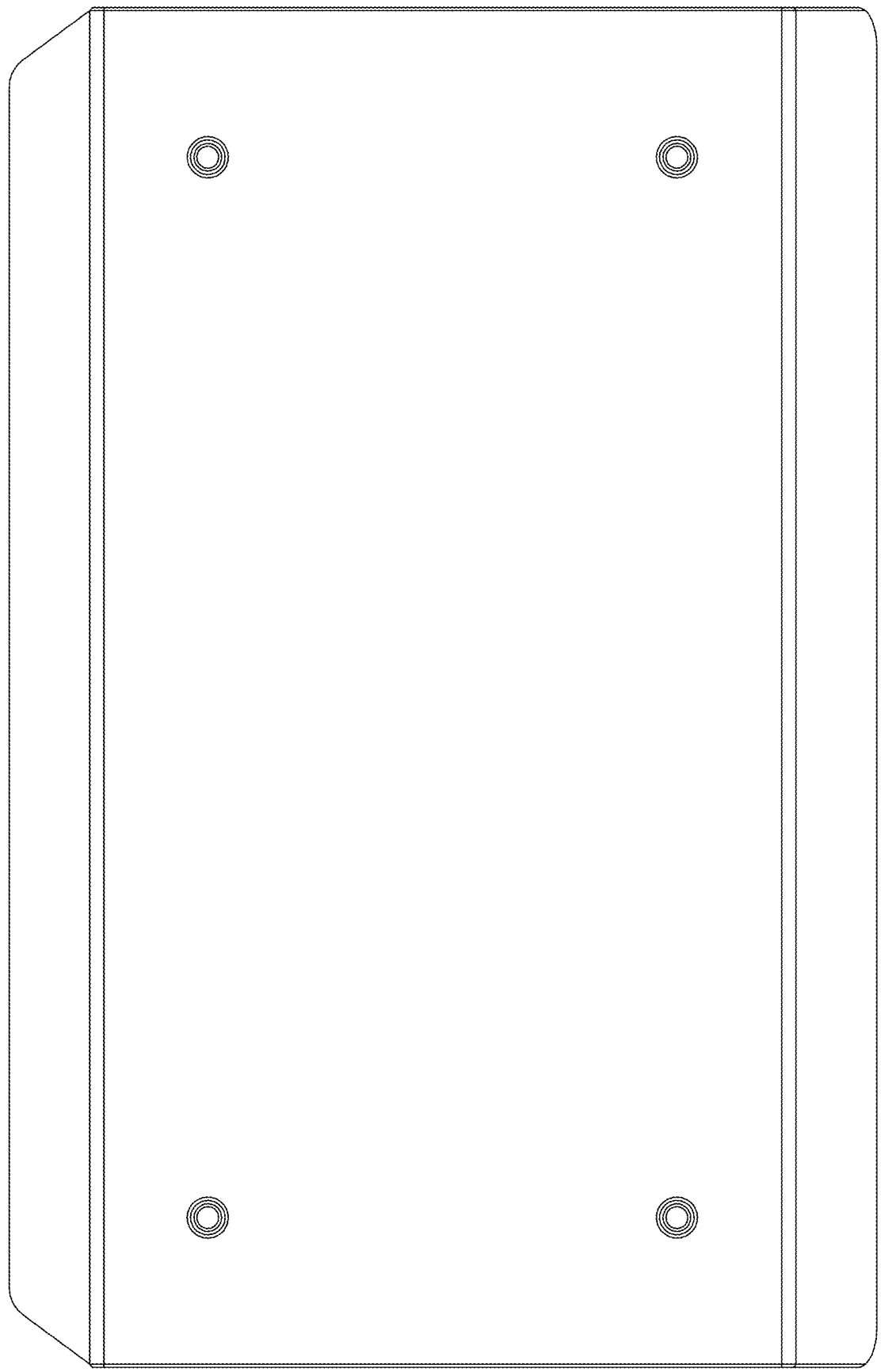
Figure 7E:
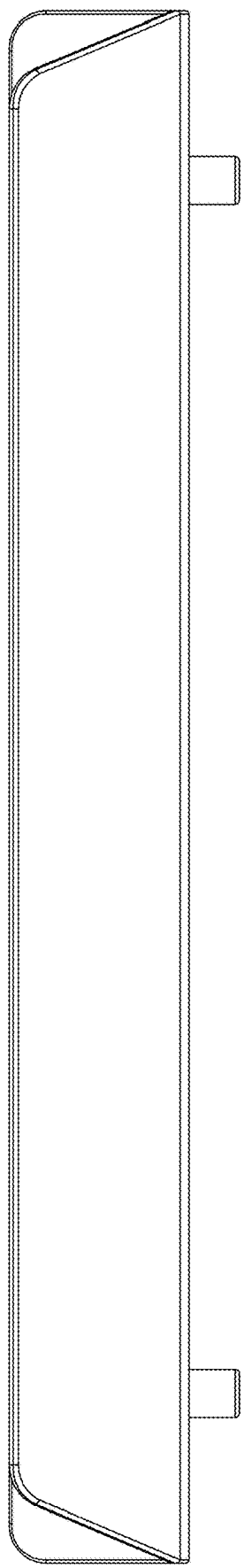
Figure 7F:
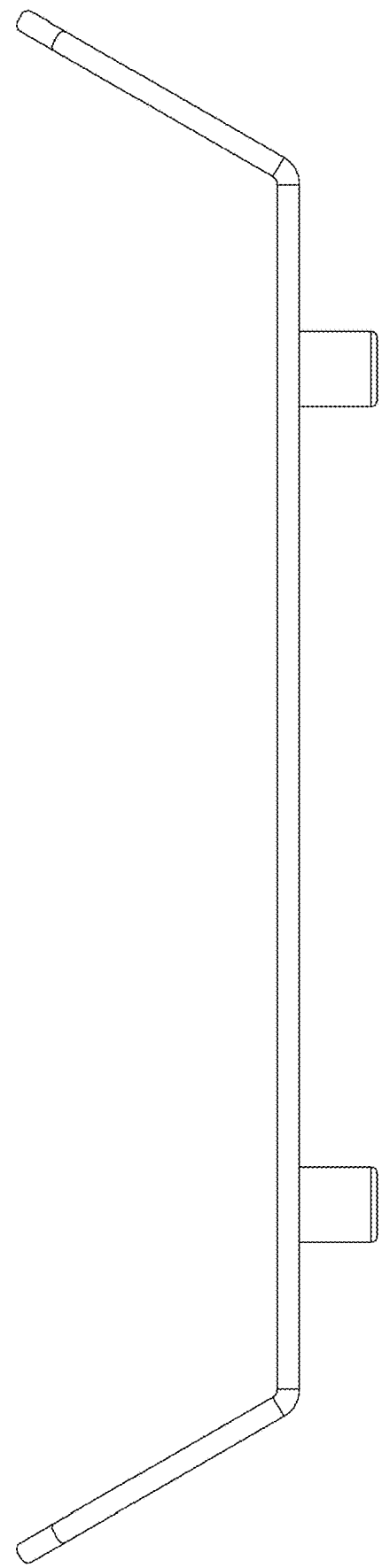
Figure 8A:
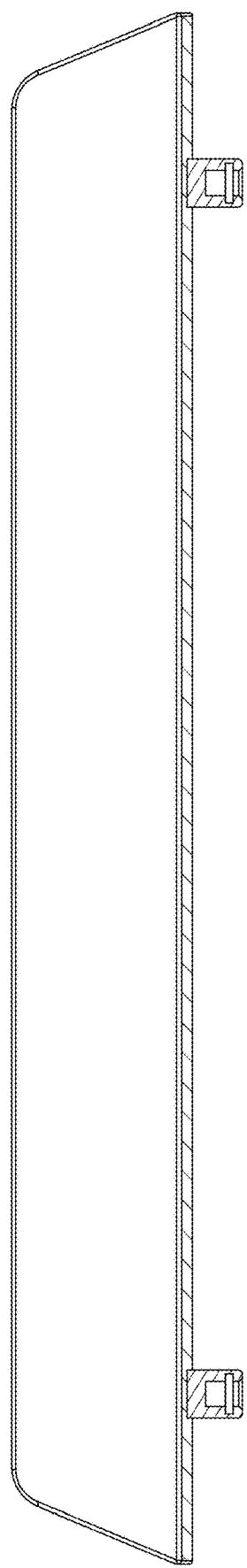
FIGS. 8A-8D are cross-sectional views of the tray assembly shown in FIGS. 7A-7F.
Figure 8B:
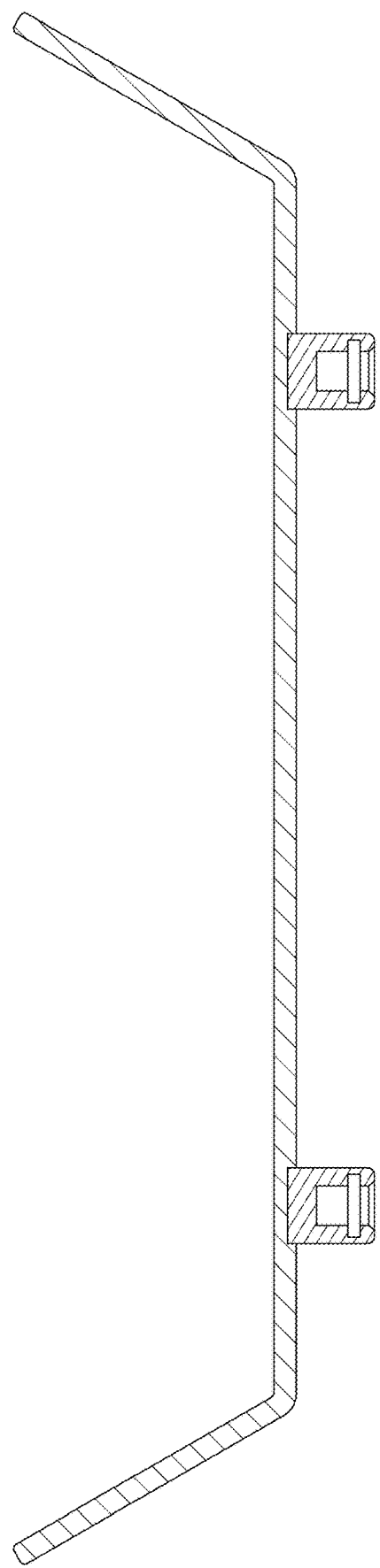
Figure 8C:
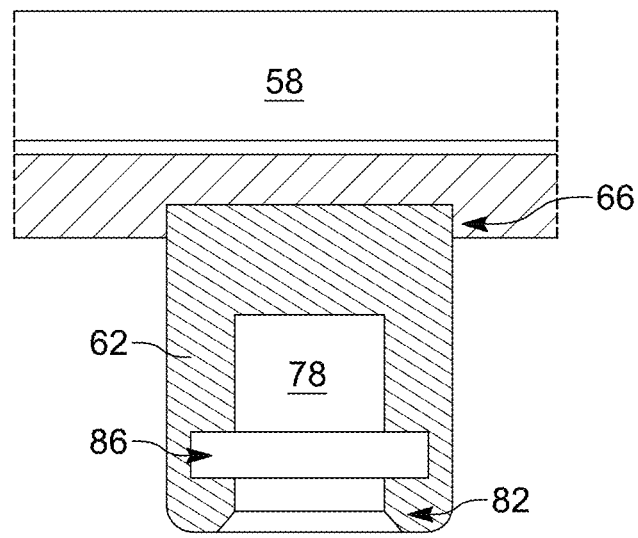
Figure 8D:
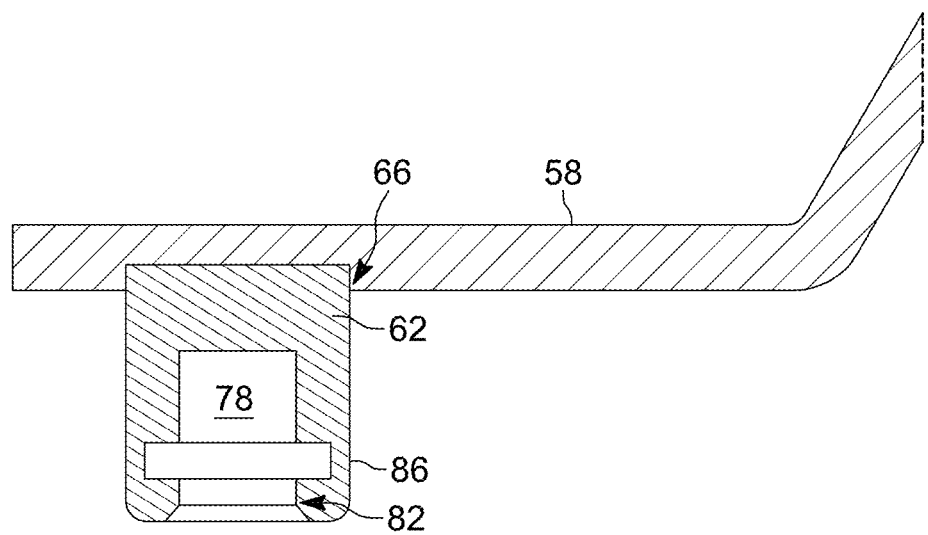

Each load cell isolation mount 130 is connected between the frame assembly 126 and the associated load cell 30. As shown in FIGS. 6F-6G, a fastener 162 connects the mounting bar 134 to the isolation member 130, and a fastener assembly 166, including a portion integral to the isolation mount 130 and a nut, connects the isolation mount 130 to the load cell 30. The illustrated isolation members 130 are formed of an elastomeric material, such as a rubber.

In the illustrated construction, each load cell 30 includes a planar beam load cell; in other constructions (not shown), the weight sensor may include a different type of sensor, such as a strain-gauge force sensor. The scale 10 includes at least one load cell 30 (two shown) at each end of the tray assembly 14, and each mounting bar 134 is supported by two load cells 30.

Movement of an object being weighed (for example, a human and, especially, an infant) can introduce inaccuracy into measurement of the weight by the weight sensor (with separate load cells 30 supporting the tray assembly 14). Each mounting bar 134 connects the associated load cells, and the crossbar(s) 138 connect the mounting bars 134 and the load cell(s) 30 at each end and, as a result, may reduce the inaccuracy caused by the moving human being weighed.

The scale 10 also includes (see FIG. 1A) a user interface 170. The interface 170 includes an input device 174 (one or more sensors, keys, buttons, a touch screen, etc.) for receiving an input from a user (e.g., "ON/OFF", "MENU", "ZERO/TARE", "CLEAR/REWEIGH", "HOLD/RECALL", unit selection ("LB/KG", "LB/GM"), unit lock, unit conversion, "STORE WGHT", "UP", "DOWN", "ENTER", "CALIBRATE", "OPTION", motion/gesture detection, identifying information, etc.)). An output device 178 (a LCD display (as shown), an audible output, etc.) provides feedback to the user (e.g., a measured weight, an indication of an input on the input device 174 or selected function, operational characteristics of the scale 10, etc.).

A power source (e.g., batteries 182 (two of six shown in FIG. 2F)) powers electronic components of the scale 10. The batteries 182 are supported in a battery compartment 186 closed by a battery cover 190 held in place by fasteners (thumb screws 194). As shown in FIGS. 2A-2F, the battery compartment 186 is accessed by removing the tray assembly 14, the housing cover 50 and the battery cover 190.

In illustrated embodiments, the scale 10, 10' may generally include a tray mounting assembly 18 which may provide flexibility in removal and/or installation of the tray assembly 14, increased durability of/reduced likelihood of damage to components of the scale 10, 10', etc., while maintaining a suitable connection between the tray assembly 14 and the scale base 22. In illustrated embodiments, the scale 10, 10' includes a chassis 118 (e.g., the frame assembly 126) constructed to reduce the inaccuracy of weight measurements caused by the moving object being weighed (e.g., an infant).

The independent embodiments described above and illustrated in the figures are presented by way of example only and are not intended as a limitation upon the concepts and principles of the present invention. As such, it will be that various changes in the elements and their configuration and arrangement are possible without departing from the spirit and scope of the present invention. For example, various alternatives to the certain features and elements of the present invention are described with reference to specific embodiments of the present invention. With the exception of features, elements, and manners of operation that are mutually exclusive of or are inconsistent with each embodiment described above, it should be noted that the alternative features, elements, and manners of operation described with reference to one particular embodiment are applicable to the other embodiments.

One or more independent features and/or independent advantages may be set forth in the following claims:

What is claimed is:

1. A scale comprising:
   a housing assembly supportable on a surface;
   a weight sensor supported in the housing assembly;
   a platform operable to support an object to be weighed, a force on the platform being applied to the weight sensor; and
   a mounting assembly to removably connect the platform relative to the housing assembly, the mounting assembly including
      a stud supported by one of the housing assembly and the platform, the stud having a ball end, and
      a recess defined by the other of the housing assembly and the platform, the recess having an open end, the ball end of the stud being receivable in the recess through the open end to removably connect the platform.

2. The scale of claim 1, wherein the platform includes a tray.

3. The scale of claim 1, wherein the weight sensor includes a load cell.

4. The scale of claim 3, further comprising an electronic processor supported in the housing assembly, the load cell being in communication with the electronic processor.

5. The scale of claim 1, wherein the mounting assembly includes a mount defining the recess, the mount being supported by the other of the housing assembly and the platform.

6. The scale of claim 5, wherein the stud is a first stud, the recess is a first recess, and the mount is a first mount, and wherein the mounting assembly further includes
   a second stud supported by one of the housing assembly and the platform, the second stud having a second ball end, and
   a mount defining a second recess, the second mount being supported by the other of the housing assembly and the platform, the second recess having a second open end, the second ball end of the second stud being receivable in the second recess through the second open end.

7. The scale of claim 6, wherein the first stud and the second stud are supported by the housing assembly and the first mount and the second mount are supported by the platform.

8. The scale of claim 1, further comprising a retainer assembly between the stud and the recess and operable to releasably retain the stud in the recess.

9. The scale of claim 8, wherein the stud has a post opposite the ball end, an annular surface being defined between the ball end and the post, and wherein the retainer assembly includes an O-ring supported in the recess, the O-ring being engageable with the surface to releasably retain the stud in the recess.

10. The scale of claim 1, wherein the housing assembly includes a base supportable on the surface, and a cover removably connected to the base to enclose an interior of the housing assembly, the platform being removed to access the cover.

11. The scale of claim 1, wherein the mounting assembly includes a mounting bar in the housing assembly, the stud and the recess being between mounting bar and the platform, the mounting bar being between the weight sensor and the stud and the recess.

12. The scale of claim 11, wherein the stud is supported on the mounting bar and the recess is defined by the platform.

13. The scale of claim 11, wherein the mounting assembly includes an isolation member connected between the mounting bar and the weight sensor.

14. The scale of claim 11, wherein the weight sensor includes a first load cell and a second load cell spaced from the first load cell, the mounting bar being between the first load cell and the second load cell and the stud and the recess.

15. The scale of claim 11, wherein the stud is a first stud, and the recess is a first recess, wherein the mounting bar is a first mounting bar, wherein the weight sensor includes a first load cell and a second load cell spaced from the first load cell, wherein the mounting assembly further includes
   a second stud supported by one of the housing assembly and the platform, the second stud having a second ball end,
   a second recess defined by the other of the housing assembly and the platform, the second recess having a second open end, the second ball end of the second stud being receivable in the second recess through the second open end, and
   a second mounting bar in the housing assembly, the first stud and the first recess being between first mounting bar and the platform, the first mounting bar being between the first load cell and the first stud and the first recess, the second stud and the second recess being between second mounting bar and the platform, the second mounting bar being between the second load cell and the second stud and the second recess.

16. The scale of claim 15, wherein the mounting assembly include a crossbar connected between the first mounting bar and the second mounting bar.

17. The scale of claim 16, wherein the crossbar is a first crossbar, and wherein the mounting assembly includes a second crossbar spaced from the first crossbar and connected between the first mounting bar and the second mounting bar.

18. The scale of claim 16, wherein each of the first stud and the second stud has a post opposite the ball end, the post of the first stud extending through complementary openings in the first mounting bar and the crossbar, the post of the second stud extending through complementary openings in the second mounting bar and the crossbar.

19. A scale comprising:

a housing assembly supportable on a surface;

a platform operable to support an object to be weighed;

a weight sensor supported in the housing assembly, a force on the platform being applied to the weight sensor, the weight sensor including a first load cell and a second load cell spaced from the first load cell; and a frame assembly between the platform and the weight sensor, the frame assembly including a first mounting bar engaging the first load cell, a second mounting bar engaging the second load cell, and a crossbar connecting the first mounting bar and the second mounting bar.

20. A method of assembling a scale, the method comprising:

providing a scale body including a housing assembly supportable on a surface, and a weight sensor supported in the housing assembly;

providing a platform operable to support an object to be weighed, a force on platform being applied to the weight sensor; and engaging a mounting assembly to removably connect the platform relative to the housing assembly, the mounting assembly including a plurality of studs supported by one of the housing assembly and the platform, each stud having a ball end, and a corresponding plurality of mounts supported by the other of the housing assembly and the platform, each mount defining a recess having an open end, engaging including inserting the ball end of an associated stud in the recess through the open end to removably connect the platform.

* * * * *